US010471692B2

(12) United States Patent
Shibai et al.

(10) Patent No.: US 10,471,692 B2
(45) Date of Patent: Nov. 12, 2019

(54) OPTICAL MEMBER AND POLYMERIZABLE COMPOSITION FOR NANOIMPRINTING

(71) Applicant: SHARP KABUSHIKI KAISHA, Sakai, Osaka (JP)

(72) Inventors: Yasuhiro Shibai, Sakai (JP); Ken Atsumo, Sakai (JP); Hidekazu Hayashi, Sakai (JP); Nobuaki Yamada, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 12 days.

(21) Appl. No.: 15/743,373

(22) PCT Filed: Aug. 1, 2016

(86) PCT No.: PCT/JP2016/072464
§ 371 (c)(1),
(2) Date: Jan. 10, 2018

(87) PCT Pub. No.: WO2017/022701
PCT Pub. Date: Feb. 9, 2017

(65) Prior Publication Data
US 2018/0201001 A1 Jul. 19, 2018

(30) Foreign Application Priority Data
Aug. 6, 2015 (JP) .................. 2015-155932

(51) Int. Cl.
B32B 3/30 (2006.01)
B32B 27/30 (2006.01)
(Continued)

(52) U.S. Cl.
CPC .............. *B32B 27/308* (2013.01); *B32B 3/30* (2013.01); *B32B 23/08* (2013.01); *B32B 27/30* (2013.01);
(Continued)

(58) Field of Classification Search
CPC ....................................................... B32B 3/30
(Continued)

(56) References Cited

U.S. PATENT DOCUMENTS

2007/0065757 A1 3/2007 Ogino et al.
2013/0004718 A1* 1/2013 Takihara .................. G02B 1/04
428/156
2014/0127463 A1 5/2014 Otani et al.

FOREIGN PATENT DOCUMENTS

JP 2007-084625 A 4/2007
JP 2007-291372 A 11/2007
(Continued)

*Primary Examiner* — Brent T O'Hern
(74) *Attorney, Agent, or Firm* — ScienBiziP, P.C.

(57) ABSTRACT

The present invention provides an optical member with which degradation of adhesion between a substrate containing triacetylcellulose and a polymer layer caused by moisture absorption is suppressed. An optical member according to the present invention includes a substrate and a polymer layer in direct contact with the substrate and having an indented structure on a surface thereof, the indented structure including multiple protrusions formed at a pitch not greater than a wavelength of visible light. Triacetylcellulose is present in at least a surface of the substrate on the polymer layer side, the polymer layer is formed from a polymerizable composition polymerizable by active energy ray irradiation, and the polymerizable composition contains 30 parts by weight or more and 75 parts by weight or less of a polyfunctional acrylate, 25 parts by weight or more and 60 parts by weight or less of a monofunctional monomer having a tertiary amide group, and 0.1 parts by weight or more and 10 parts by weight or less of a fluorine-containing compound having a reactive group.

11 Claims, 2 Drawing Sheets

(51) Int. Cl.
*B32B 23/08* (2006.01)
*G02B 1/118* (2015.01)
*G02B 1/111* (2015.01)

(52) U.S. Cl.
CPC .............. *G02B 1/111* (2013.01); *G02B 1/118* (2013.01); *B32B 2250/02* (2013.01); *B32B 2250/24* (2013.01); *B32B 2307/40* (2013.01)

(58) Field of Classification Search
USPC ........................................................ 428/172
See application file for complete search history.

(56) References Cited

FOREIGN PATENT DOCUMENTS

| | | | |
|---|---|---|---|
| JP | 2012-247681 A | | 12/2012 |
| JP | 2012247681 A | * | 12/2012 |
| JP | 2013-039711 A | | 2/2013 |
| JP | 2013-252689 A | | 12/2013 |
| JP | 2014-095740 A | | 5/2014 |
| JP | 2014-102320 A | | 6/2014 |
| JP | 5573836 B2 | | 8/2014 |
| WO | 2013/005769 A1 | | 1/2013 |

* cited by examiner (a)

(b)

(c)

(d)

OPTICAL MEMBER AND POLYMERIZABLE COMPOSITION FOR NANOIMPRINTING

TECHNICAL FIELD

The present invention relates to an optical member and a polymerizable composition for nanoimprint. In particular, the present invention relates to an optical member having a nanometer-size indented structure and a polymerizable composition for nanoimprint suitable for use as a material for the optical member.

BACKGROUND ART

For optical members having anti-reflection properties, various studies have been extensively conducted (for example, refer to PTL 1 to PTL 3). In particular, optical members having nanometer-size indented structures are known to have excellent anti-reflection properties (for example, refer to PTL 4 to PTL 8). Such indented structures can dramatically reduce the reflected light since the refractive index continuously change from the air layer toward the substrate.

CITATION LIST

Patent Literature

PTL 1: Japanese Unexamined Patent Application Publication No. 2007-291372
PTL 2; Japanese Unexamined Patent Application Publication No. 2014-102320
PTL 3: Japanese Unexamined Patent Application Publication No. 2014-95740
PTL 4: International Publication No. 2013/005769
PTL 5: Japanese Patent No. 5573836 Specification
PTL 6: Japanese Unexamined Patent Application Publication No. 2013-39711
PTL 7: Japanese Unexamined Patent Application Publication No. 2013-252689
PTL 8: Japanese Unexamined Patent Application Publication No. 2007-84625

SUMMARY OF INVENTION

Technical Problem

An example of such an optical member is a structure in which a polymer layer having anti-reflection properties is disposed on a substrate. A substrate containing triacetylcellulose (TAC) is, for example, used as the substrate since it has excellent optical properties (for example, transparency). However, studies conducted by the inventors of the present invention have revealed that, when a substrate containing triacetylcellulose is used, an issue of low adhesion between the substrate and the polymer layer arises due to high polarity of triacetylcellulose compared, to other types of substrates (for example, substrates containing polyethylene terephthalate (PET) and substrates containing methyl methacrylate (MMA)). One possible approach is to subject the surface of the substrate containing triacetylcellulose to a primer treatment so as to decrease the polarity and enhance adhesion to the polymer layer.

However, it has been found that conducting the primer treatment not only increases the manufacturing cost but also has impact, on the environment. Moreover, a substrate containing triacetylcellulose has a high hygroscopic property, and the hygroscopic property is as high as ever if no primer treatment, is conducted. In particular, it has been found that, at high humidity, the adhesion to the polymer layer is likely to decrease due to significant moisture absorption.

As described above, for optical members of related art that have substrates containing triacetylcellulose, a challenge has been to suppress degradation of adhesion caused by moisture absorption between a polymer layer and a substrate containing triacetylcellulose without having to perform a primer treatment. However, no measures for addressing such a challenge have been found.

For example, PTL 4 describes that a substrate containing triacetylcellulose and a cured product, which is obtained from an active-energy-ray-curable resin composition and has a fine indented structure, are adhered to each other, but does not mention degradation of adhesion caused by moisture absorption and thus does not address the challenge described above. The inventions described in PTL 1 to PTL 3 and PTL 5 to PTL 8 also do not address the challenge described above.

The present invention has been made under the current situation described above, and an object thereof is to provide an optical member with which degradation of adhesion between a substrate containing triacetylcellulose and a polymer layer caused by moisture absorption is suppressed. Another object is to provide a polymerizable composition for nanoimprint, the polymerizable composition constituting a polymer layer that suppresses degradation of adhesion to the substrate containing triacetylcellulose caused by moisture absorption.

Solution to Problem

The inventors of the present invention have conducted extensive studies on optical member's with which degradation of adhesion between a substrate containing triacetylcellulose and a polymer layer caused by moisture absorption is suppressed, and focused on a structure in which a polymerizable composition that constitutes the polymer layer contains, in addition to a polyfunctional acrylate, a component having strong bonding power to triacetylcellulose and a component that decreases the hygroscopic property. It has been found that the bonding power to triacetylcellulose is enhanced by using a monofunctional monomer having a tertiary amide group. It has also been found that the hygroscopic property is decreased by using a fluorine-containing compound having a reactive group. As a result, it has been found that when the polymerizable composition contains a polyfunctional acrylate, a monofunctional monomer, and a fluorine-containing compound at a particular ratio, degradation of adhesion between a substrate containing triacetylcellulose and a polymer layer caused by moisture absorption is suppressed. The challenge described above can be satisfactorily addressed on the basis of the findings described above, and the present invention has been made.

In other words, an aspect of the present invention may provide an optical member that includes a substrate and a polymer layer in direct contact with the substrate and having an indented structure, on a surface thereof, the indented structure including multiple protrusions formed at a pitch not greater than a wavelength of visible light, wherein triacetylcellulose is present on at least a surface of the substrate on a polymer layer side, the polymer layer is formed from a polymerizable composition polymerizable by active energy ray irradiation, and the polymerizable composition contains 30 parts by weight or more and 75 parts by weight or less of a poly functional acrylate, 25 parts by weight or more and 60 parts by weight or less of a monofunctional monomer having a tertiary amide group, and 0.1 parts by weight or more and 10 parts by weight or less of a fluorine-containing compound having a reactive group.

Another aspect of the present invention may provide a polymerizable composition for nanoimprint, the composition containing 30 parts by weight or more and 75 parts by weight or less of a polyfunctional acrylate, 25 parts by weight or more and 60 parts by weight or less of a monofunctional monomer having a tertiary amide group, and 0.1 parts by weight or more and 10 parts by weight or less of a fluorine-containing compound having a reactive group, the composition being polymerizable by active energy ray irradiation.

Advantageous Effects of Invention

The present invention can provide an optical member with which degradation of adhesion between a substrate containing triacetylcellulose and a polymer layer caused by moisture absorption is suppressed. The present invention can also provide a polymerizable composition for nanoimprint, the polymerizable composition constituting a polymer layer that suppresses degradation of adhesion to a substrate containing triacetylcellulose caused by moisture absorption.

DESCRIPTION OF EMBODIMENTS

Figure 1:
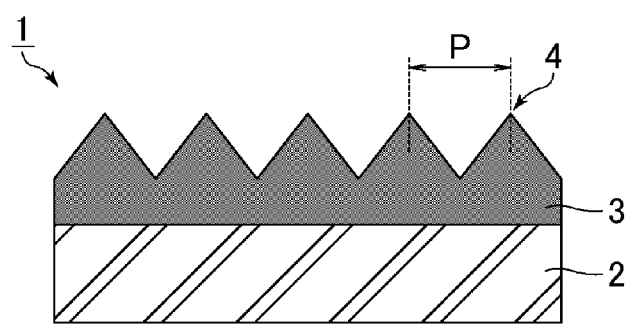
FIG. 1 is a schematic cross-sectional view of an optical member according to an embodiment.

The present invention will now be described in further details through embodiments by referring to the drawings, but the present invention is not limited to these embodiments. Moreover, the features of the embodiments can be used in combination or altered as appropriate without departing from the gist of the present invention.

EMBODIMENTS

FIG. 1 is a schematic cross-sectional view of an optical member according to an embodiment. As illustrated in FIG. 1, an optical member 1 includes a substrate 2 and a polymer layer 3 in direct contact with the substrate 2. The polymer layer 3 has an indented structure on a surface thereof, the indented structure including protrusions (projections) 4 formed at a pitch (distance between the apexes of adjacent protrusions 4) P not greater than the wavelength of visible light. Thus, the optical member 1 corresponds to an anti-reflection member that has a moth-eye structure (structure resembling eyes of moths). Due to this moth-eye structure, the optical member 1 can offer excellent anti-reflection properties (low reflection).

Triacetylcellulose (TAC) is present on at least a surface of the substrate 2 on the polymer layer 3 side. For the purposes of this description, triacetylcellulose refers to cellulose acetate having an acetylation degree of 58% or more and more preferably cellulose acetate having an acetylation degree of 61% or more. The surface of the substrate 2 on the polymer layer 3 side does not have to be surface-treated, but may be subjected to a surface treatment, such as washing, as long as the chemical structure of the triacetylcellulose does not change. The surface of the substrate 2 on the polymer layer 3 side is not subjected to a surface treatment, such as a saponification treatment, that changes the chemical structure of triacetylcellulose. Whether or not the substrate 2 is subjected to a surface treatment that changes the chemical structure of triacetylcellulose can be examined by the following procedure, for example. First, a substrate 2 on which the polymer layer 3 is not yet placed is prepared, or the polymer layer 3 is removed from the optical member 1 by a physical process to expose the surface of the substrate 2. Then, the surface of the substrate 2 and the surface of a separately prepared substrate containing triacetylcellulose and not subjected to a surface treatment are analyzed by FT-IR measurement using an attenuated total reflection (ATR) technique, and the absorption spectra of the two surfaces are compared for examination. Since the substrate 2 and the polymer layer 3 are in direct contact with each other, a layer formed by a surface treatment (for example, a primer layer formed by a primer treatment) is not formed on the surface of the substrate 2 on the polymer layer 3 side. The substrate 2 may be solely composed of triacetylcellulose or may contain, as appropriate, additives such as a plasticizer in addition to triacetylcellulose as long as the chemical structure of triacetylcellulose present on the surface of the substrate 2 on the polymer layer 3 side does not change.

The shape of the substrate 2 is not particularly limited, and examples of the shape include a film shape and a sheet shape. When the optical member 1 is to have a film shape, a film-shaped substrate 2 may be used, and a triacetylcellulose film (TAC film) is suitable for the use. Preferably, the substrate 2 constitutes a part of a polarizer.

The thickness of the substrate 2 is not particularly limited; however, from the viewpoint of ensuring transparency and workability, the thickness is preferably 50 μm or more and 100 μm or less.

The polymer layer 3 is formed from a polymerizable composition (a polymerizable composition 5 illustrated in FIG. 2 described below) that polymerizes by active energy ray irradiation. For the purposes of this description, the active energy ray refers to an ultraviolet (UV) ray, a visible light beam, an infrared ray, a plasma, etc. The polymerizable composition is preferably polymerizable by UV irradiation.

The polymerizable composition contains 30 parts by weight or more and 75 parts by weight or less of a polyfunctional acrylate, 25 part's by weight or more and 60 parts by weight or less of a monofunctional monomer having a tertiary amide group (hereinafter may be simply referred to as a monofunctional monomer), and 0.1 parts by weight or more and 10 parts by weight or less of a fluorine-containing compound having a reactive group (hereinafter may be simply referred to as a fluorine-containing compound). According to this feature, a polymerizable composition for nanoimprint that constitutes a polymer layer 3 with which degradation of adhesion to the substrate 2 caused by moisture absorption is suppressed is obtained. As a result, an optical member 1 with which degradation of adhesion between the substrate 2 and the polymer layer 3 caused by moisture absorption is suppressed is obtained.

Examples of the polyfunctional acrylate include pentaerythritol triacrylate, ethoxylated pentaerythritol tetraacrylate, 1,6-hexanediol diacrylate, tripropylene glycol diacrylate, and ethoxylated (4-mol adduct) bisphenol A diacrylate. Known examples of pentaerythritol triacrylate include a polyfunctional acrylate (trade name: A-TMM-3LM-N) produced by Shin-Nakamura Chemical Co., Ltd., etc. Known examples of ethoxylated pentaerythritol tetraacrylate include a polyfunctional acrylate (trade name: ATM-35E) produced by Shin-Nakamura Chemical Co., Ltd., etc. Known examples of 1,6-hexanediol diacrylate include a polyfunctional acrylate (trade name: A-HD-N) produced by Shin-Nakamura Chemical Co., Ltd., etc. Known examples of tripropylene glycol diacrylate include a polyfunctional acrylate (trade name: APG-200) produced by Shin-Nakamura Chemical Co., Ltd., etc. Known examples of ethoxylated (4-mol adduct) bisphenol A diacrylate include a polyfunctional acrylate (trade name: A-BPE-4) produced by Shin-Nakamura Chemical Co., Ltd., etc. The polyfunctional acrylate may be solely composed of one polyfunctional acrylate or may be a combination of multiple polyfunctional acrylates.

The polyfunctional acrylate content is 30 parts by weight or more and 75 parts by weight or less. When the polyfunctional acrylate content is less than 30 parts by weight, the monofunctional monomer content and the fluorine-containing compound content become relatively excessively large. As a result, the polarity of the polymer layer 3 may become excessively high or the amount of the tertiary amide groups on the surface of the polymer layer 3 on the substrate 2 side relatively decreases due to the increase in the amount of fluorine atoms. This results in degradation of adhesion between the substrate 2 and the polymer layer 3 by moisture absorption. When the polyfunctional acrylate content is greater than 75 parts by weight, the monofunctional monomer content and the fluorine-containing compound content become relatively excessively small. As a result, the amount of the tertiary amide groups in the polymer layer 3 may become excessively small or the amount of fluorine atoms in the polymer layer 3 may become excessively small, resulting in a higher hygroscopic property. This results in degradation of adhesion between the substrate 2 and the polymer layer 3. When the polyfunctional acrylate is composed of a combination of multiple polyfunctional acrylates, the total content of the polyfunctional acrylates is defined to be the polyfunctional acrylate content.

The monofunctional monomer has a tertiary amide group. The tertiary amide group has strong hydrogen bonding power and thus strongly bonds to the hydroxyl group, the ester structure, and the ether structure of the triacetylcellulose present on the surface of the substrate 2 on the polymer layer 3 side. Thus, when a monofunctional monomer having a tertiary amide group is used, a polymerizable composition for nanoimprint that constitutes a polymer layer 3 having high adhesion to the substrate 2 is obtained. As a result, an optical member 1 in which the adhesion between the substrate 2 and the polymer layer 3 is high is obtained. In contrast, primary and secondary amide groups have high polarity and small bonding power; thus, the adhesion to the substrate 2 is low compared to the tertiary amide group.

Examples of the monofunctional monomer having a tertiary amide group include N-acryloylmorpholine, N,N-dimethylacrylamide, N,N-diethylacrylamide, N,N-dimethylmethacrylamide, and N-methoxy-N-methyl-3-phenyl-acrylamide. Known examples of N-acryloylmorpholine include a monofunctional monomer (trade name: ACMO (registered trademark)) produced by KJ Chemicals Corporation, etc. Known examples of N,N-dimethylacrylamide include a monofunctional monomer (trade name: DMAA (registered trademark)) produced by KJ Chemicals Corporation, etc. Known examples of N,N-diethylacrylamide include a monofunctional monomer (trade name: DEAA (registered trademark)) produced by KJ Chemicals Corporation, etc. Known examples of N,N-dimethylmethacrylamide include a monofunctional monomer (product code: D0745)) produced by Tokyo Chemical Industry Co., Ltd., etc. Known examples of N-methoxy-N-methyl-3-phenyl-acrylamide include a monofunctional monomer (N-methoxy-N-methyl-3-phenyl-acrylamide) produced by Signta-Aldrich etc. The monofunctional monomer may be solely composed of one monofunctional monomer or may be a combination of multiple monofunctional monomers. The monofunctional monomer preferably contains at least one selected from the group consisting of N-acryloylmorpholine, N,N-dimethylacrylamide, and N,N-diethylacrylamide.

The content of the monofunctional monomer having a tertiary amide group is 25 parts by weight or more and 60 parts by weight or less. When the monofunctional monomer content is less than 25 parts by weight, the amount of the tertiary amide groups in the polymer layer 3 becomes excessively small, and thus the adhesion between the substrate 2 and the polymer layer 3 is degraded by moisture absorption. When the monofunctional monomer content is more than 60 parts by weight, the polarity of the polymer layer 3 becomes excessively high, and thus the adhesion between the substrate 2 and the polymer layer 3 is degraded by moisture absorption. From the viewpoint of sufficiently suppressing degradation of the adhesion between the substrate 2 and the polymer layer 3 by moisture absorption, the monofunctional monomer content is preferably 30 parts by weight or more and 55 parts by weight or less, and more preferably 35 parts by weight or more and 50 parts by weight or less. When the monofunctional monomer is composed of a combination of multiple monofunctional monomers, the total content of the monofunctional monomers is defined to be the monofunctional monomer content.

The fluorine-containing compound has a reactive group. The fluorine-containing compound contains a fluorine-containing monomer as a constitutional component. The fluorine-containing compound may contain other monomer components, such as acrylate monomers. For the purposes of this description, the reactive group refers to the site that reacts with other components under external energy such as light, heat, etc. Examples of the reactive group include an alkoxysilyl group, a silyl ether group, a silanol group in which an alkoxysilyl group is hydrolyzed, a carboxyl group, a hydroxyl group, an epoxy group, a vinyl group, an allyl group, an acryloyl group, and a methacryloyl group. From the viewpoints of reactivity and handling ease, the reactive group is preferably an alkoxysilyl group, a silyl ether group, a silanol group, an epoxy group, a vinyl group, an allyl group, an acryloyl group or a methacryloyl group, preferably a vinyl group, an allyl group, an acryloyl group or a methacryloyl group, and more preferably an acryloyl group or a methacryloyl group.

When the fluorine-containing compound having a reactive group is used, fluorine atoms align on the surface of the polymer layer 3 remote from the substrate 2 and are immobilized; thus, the hygroscopic property can be decreased. As a result, degradation of the adhesion between the substrate 2 and the polymer layer 3 caused by moisture absorption can be suppressed. Furthermore, since the polymerizable composition contains a fluorine-containing compound, degradation of the adhesion between the substrate 2 and the polymer layer 3 caused by moisture absorption can be suppressed even when the monofunctional monomer content is increased and the polarity is excessively high.

By using the fluorine-containing compound having a reactive group, the surface energy of the polymer layer 3 can be decreased, and due to this feature in combination with the moth-eye structure, an optical member 1 having excellent water repellency is obtained. As a result, an optical member 1 having an excellent antifouling property for hydrophilic stains is obtained. A water contact angle is frequently used as the indicator of the degree of water repellency. The larger the water contact angle, the higher the water repellency. From the viewpoint of obtaining an optical member 1 having sufficiently high water repellency, the water contact angle with respect to the surface of the polymer layer 3 remote from the substrate 2 (the surface having the indented structure) is preferably 60° or more.

The fluorine-containing compound preferably has, in addition to the reactive group, at least one selected from the group consisting of a fluoroalkyl group, a fluorooxyalkyl group, a fluoroalkenyl group, a fluoroalkanediyl group, and a fluorooxyalkanediyl group. The fluoroalkyl group, the fluorooxyalkyl group, the fluoroalkenyl group, the fluoroalkanediyl group, and the fluorooxyalkanediyl group are, respectively, substituents obtained by substituting at least some of hydrogen atoms contained in an alkyl group, an oxyalkyl group, an alkenyl group, an alkanediyl group, and an oxyalkanediyl group with fluorine atoms. The fluoroalkyl groups, the fluorooxyalkyl group, the fluoroalkenyl group, the fluoroalkanediyl group, and the fluorooxyalkanediyl group are substituents mainly composed of fluorine atoms and carbon atoms and may have branched portions in their structures; furthermore, two or more of these substituents may be linked.

Examples of the fluorine-containing monomer, which is a constitutional component of the fluorine-containing compound, include those represented by general formula (A).

$$R^{f1}\text{-}R^2\text{-}D^1 \quad (A)$$

In general formula (A), $R^{f1}$ represents a site that contains at least one selected from the group consisting of a fluoroalkyl group, a fluorooxyalkyl group, a fluoroalkenyl group, a fluoroalkanediyl group, and a fluorooxyalkanediyl group. $R^2$ represents an alkanediyl group, an alkanetriyl group, or an ester structure, a urethane structure, an ether structure, or a triazine structure derived from the foregoing. $D^1$ represents a reactive, group.

Examples of the fluorine-containing monomer represented by general formula (A) include 2,2,2-trifluoroethyl acrylate, 2,2,3,3,3-pentafluoropropyl acrylate, 2-perfluorobutylethyl acrylate, 3-perfluorobutyl-2-hydroxypropyl acrylate, 2-perfluorohexylethyl acrylate, 3-perfluorohexyl-2-hydroxypropyl acrylate, 2-perfluorooctylethyl acrylate, 3-perfluorooctyl-2-hydroxypropyl acrylate, 2-perfluorodecylethyl acrylate, 2-perfluoro-3-methylbutylethyl acrylate, 3-perfluoro-3-methoxybutyl-2-hydroxypropyl acrylate, 2-perfluoro-5-methylhexylethyl acrylate, 3-perfluoro-5-methylhexyl-2-hydroxypropyl acrylate, 2-perfluoro-7-methyloctyl-2-hydroxypropyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutyl ethyl methacrylate, 3-perfluorobutyl-2-hydroxypropyl methacrylate, 2-perfluorooctylethyl methacrylate, 3-perfluorooctyl-2-hydroxypropyl methacrylate, 2-perfluorodecyl ethyl methacrylate, 2-perfluoro-3-methylbutyl ethyl methacrylate, 3-perfluoro-3-methylbutyl-2-hydroxypropyl methacrylate, 2-perfluoro-5-methylhexylethyl methacrylate, 3-perfluoro-5-methylhexyl-2-hydroxypropyl methacrylate, 2-perfluoro-7-methyloctylethyl methacrylate, 3-perfluoro-7-methyloctylethyl methacrylate, tetrafluoropropyl methacrylate, octafluoropentyl methacrylate, dodecafluoroheptyl methacrylate, hexadecafluorononyl methacrylate, 1-trifluoromethyltrifluoroethyl methacrylate, hexafluorobutyl methacrylate, and triacryloyl-heptadecafluorononenyl-pentaerythritol.

Examples of the material suitable for the fluorine-containing monomer include materials having fluoropolyether sites. The fluoropolyether site is a site composed of a fluoroalkyl group, an oxyfluoroalkyl group, an oxyfluoroalkyldiyl group, or the like, and has a structure represented by general formula (B) or (C) below:

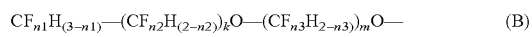

$$CF_{n1}H_{(3-n1)}\text{---}(CF_{n2}H_{(2-n2)})_k O\text{---}(CF_{n3}H_{2-n3})_m O\text{---} \quad (B)$$

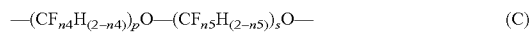

$$\text{---}(CF_{n4}H_{(2-n4)})_p O\text{---}(CF_{n5}H_{(2-n5)})_s O\text{---} \quad (C)$$

In general formulae (B) and (C), n1 represents an integer of 1 to 3, n2 to n5 represent 1 or 2, and k, m, p, and s represent an integer of 0 or more. Examples of the preferable combination of n1 to n5 include n1 representing 2 or 3 and n2 to n5 representing 1 or 2, and examples of the more preferable combination include n1 representing 3, n2 and n4 representing 2, and n3 and n5 representing 1 or 2.

The number of carbon atoms contained in the fluoropolyether site is preferably 4 or more and 12 or less, more preferably 4 or more and 10 or less, and yet more preferably 6 or more and 8 or less. When the number of carbon atoms is less than 4, the surface energy may decrease. When the number of carbon atoms is more than 12, solubility in a solvent may decrease. Note that, the fluorine-containing monomer may have two or more fluoropolyether sites per molecule.

Examples of the known fluorine-containing compound having a reactive group include a fluorine-based additive (trade name: OPTOOL (registered trademark) DAC-HP) produced by DAIKIN INDUSTRIES, LTD., a fluorine-based additive (trade name: Afluid) produced by Asahi Glass Co., Ltd., a fluorine-based additive (trade name: MEGAFACE (registered trademark) RS-76-NS) produced by DIC Corporation, a fluorine-based additive (trade name: MEGAFACE RS-90) produced by DIC Corporation, a fluorine-based additive (trade name: FTERGENT (registered trademark) 601AD) produced by NEOS Company Limited, a fluorine-based additive (trade name: C10GACRY) produced by YUSHISEIHIN Co., Ltd., and a fluorine-based additive (trade name: C8HGOL) produced by YUSHISEIHIN Co., Ltd. The fluorine-containing compound is preferably polymerizable by UV irradiation and preferably has a —$OCF_2$— chain and/or a =NCO— chain. The fluorine-containing compound may be solely composed of one fluorine-containing compound or may be a combination of multiple fluorine-containing compounds.

The fluorine atom concentration in the fluorine-containing compound having a reactive group is preferably 20 wt % or more and 50 wt % or less, more preferably 25 wt % or more and 45 wt % or less, and yet more preferably 30 wt % or more and 40 wt % or less. When the fluorine atom concentration in the fluorine-containing compound is less than 20 wt %, the amount of fluorine atoms is small, and the fluorine atoms do not readily align on the surface of the polymer layer 3 remote from the substrate 2. Thus, the adhesion between the substrate 2 and the polymer layer 3 may be degraded due to moisture absorption. When the fluorine atom concentration in the fluorine-containing compound is more than 50 wt %, the polarity of the fluorine-containing compound becomes excessively low, the compatibility with the monofunctional monomer in the polymerizable composition is degraded, and the fluorine atom distribution may become uneven. As a result, the fluorine atoms do not readily align on the surface of the polymer layer 3 remote from the substrate 2, and the adhesion between the substrate 2 and the polymer layer 3 may be degraded due to moisture absorption.

The content of the fluorine-containing compound having a reactive group is 0.1 parts by weight or more and 1.0 parts by weight or less. When the fluorine-containing compound content is less than 0.1 parts by weight, the amount of the fluorine atoms in the polymer layer 3 becomes excessively small, resulting in a higher hygroscopic property, and thus the adhesion between the substrate 2 and the polymer layer 3 is degraded by moisture absorption. When the fluorine-containing compound content is more than 10 parts by weight, the amount of the fluorine atoms in the polymer layer 3 becomes excessively large, and, as a result, many fluorine atoms align not only on the surface of the polymer layer 3 remote from the substrate 2 but also on the surface of the polymer layer 3 on the substrate 2 side. Thus, the amount of the tertiary amide groups on the surface of the polymer layer 3 on the substrate 2 side relatively decreases, and the adhesion between the substrate 2 and the polymer layer 3 is degraded by moisture absorption. From the viewpoint, of sufficiently suppressing degradation of the adhesion between the substrate 2 and the polymer layer 3 caused by moisture absorption, the fluorine-containing compound content is preferably 0.3 parts by weight or more and 8 parts by weight or less, and more preferably 0.5 parts by weight or more and 5 parts by weight or less. When the fluorine-containing compound is composed of a combination of multiple fluorine-containing compounds, the total content of the fluorine-containing compounds is defined to be the fluorine-containing compound content.

The polymerizable composition may contain additives, such as a polymerization initiator, in addition to the polyfunctional acrylate, the monofunctional monomer, and the fluorine-containing compound described above. An example of the polymerization initiator is a photopolymerization initiator. The photopolymerization initiator is a compound active to an active energy ray and is added to initiate the polymerization reaction for polymerizing monomers. Examples of the photopolymerization initiator include a radical polymerization initiator, an anionic polymerization initiator, and a cationic polymerization initiator. Examples of the photopolymerization initiator include acetophenones such as p-tert-butyltrichloroacetophenone, 2,2'-diethoxyacetophenone, and 2-hydroxy-2-methyl-1-phenylpropan-1-one; ketones such as benzophenone, 4,4'-bisdimethylaminobenzophenone, 2-chlorothioxanthone, 2-methylthioxanthone, 2-ethylthioxanthone, and 2-isopropylthioxanthone; benzoin ethers such as benzoin, benzoin methyl ether, benzoin isopropyl ether, and benzoin isobutyl ether; and benzyl ketals such as benzyl dimethyl ketal, hydroxycyclohexyl phenol ketone. Examples of the known photopolymerization initiator include a photopolymerization initiator (trade name: IRGACURE (registered trademark) 819) produced by BASF, and a photopolymerization initiator (trade name: LUCIRIN (registered trademark) TPO) produced by BASF.

The polymerizable composition preferably does not contain a solvent. In other words, the polymerizable composition is preferably solventless. When the polymerizable composition is solventless, the cost and environmental load (odor during use etc.) associated with the use of solvents can be reduced. Moreover, equipment for drying and removing solvents is not necessary, and thus equipment cost can be reduced. If the polymerizable composition contains a solvent, the fluorine-containing compound becomes excessively mixed, and the fluorine atoms may not align on the surface of the polymer layer 3 remote from the substrate 2. Moreover, if the solvent is not sufficiently dried, the adhesion between the substrate 2 and the polymer layer 3 may be degraded.

The thickness of the polymer layer 3 is not particularly limited, but from the viewpoint of having a high concentration of fluorine atoms aligned on the surface of the polymer layer 3 remote from the substrate 2, the thickness of the polymer layer 3 is preferably small. Specifically, the thickness is preferably 5.0 µm or more and 20.0 µm or less. For the purposes of this description, the thickness of the polymer layer refers to a distance from the surface on the substrate side to the apex of the protrusion.

The shape of the protrusions 4 formed on the surface of the polymer layer 3 is not particularly limited, and examples of the shape include a shape constituted by a columnar lower part and a semispherical upper part (bell shape), and a shape narrowing toward a tip (tapered shape), such as a cone shape (circular cone shape or the like). The protrusions 4 may have a shape that has dendrites. Dendrites are protrusions corresponding to the portion where the pitch is irregular and occur during the process of anodization and etching in preparing a mold for forming a moth-eye structure. In FIG. 1, the bottom sides of the spaces between the protrusions 4 have a sloped shape; alternatively, the bottom sides do not have to be sloped and may be horizontal.

The pitch P of the protrusions 4 may be any pitch not greater than the wavelength (780 nm) of visible light; however, from the viewpoint of preventing optical phenomena such as moire, rainbow, etc., the pitch P is preferably 100 nm or more and 400 nm or less and more preferably 100 nm or more and 200 nm or less. For the purposes of this description, the pitch of the protrusions is the average of the distances between all of adjacent protrusions excluding the dendrites within a 1 µm-square region of a plan image taken with an analyzer, i.e., a scanning electron microscope (trade name: S-4700) produced by Hitachi High-Technologies Corporation. The pitch of the protrusions is measured in a state in which the indented structure is coated with osmium oxide VIII (thickness: 5 nm) produced by Wako Pure Chemical Industries, Ltd., by using an osmium coater (trade name: Neoc-ST) produced by MEIWAFOSIS CO., LTD.

The height of the protrusions 4 is not particularly limited; however, from the viewpoint of also achieving a preferable aspect ratio of the protrusions 4 described below, the height is preferably 50 nm or more and 600 nm or less and more preferably 100 nm or more and 300 nm or less. For the purposes of this description, the height of the protrusions is the average of the heights of ten continuously lined protrusions excluding the dendrites determined from a sectional image taken with an analyzer, i.e., a scanning electron microscope (trade name: S-4700) produced by Hitachi High-Technologies Corporation. In selecting the ten protrusions, protrusions that have deformity or missing parts (such as parts that have been deformed in preparing the sample) are to be excluded. The sample is taken from a region of the optical member free of specific defects. For example, when the optical member has a roll shape continuously manufactured, the sample is taken from around the center portion. The pitch of the protrusions is measured in a state in which the indented structure is coated with osmium oxide VIII (thickness: 5 nm) produced by Wako Pure Chemical Industries, Ltd., by using an osmium coater (trade name: Neoc-ST) produced by MEIWAFOSIS CO., LTD.

The aspect ratio of the protrusions 4 is not particularly limited but is preferably 0.8 or more and 1.5 or less. When the aspect ratio of the protrusions 4 is 1.5 or less, the workability of the moth-eye structure is sufficiently enhanced, and there is a low possibility of occurrence of sticking or degradation of the transfer in forming the moth-eye structure (for example, clogging or winding of the mold). When the aspect ratio of the protrusions 4 is 0.8 or more, optical phenomena such as moire and rainbow are sufficiently prevented, and excellent reflection properties can be realized. For the purpose of this description, the aspect ratio of the protrusions is the ratio (height/pitch) of the height to the pitch of the protrusions measured by the aforementioned methods by using an analyzer, i.e., a scanning electron microscope (trade name: S-4700) produced by Hitachi High-Technologies Corporation.

The arrangement of the protrusions 4 is not particularly limited, and the protrusions 4 may be arranged at random or regularly. From the viewpoint of sufficiently preventing occurrence of moire, a random arrangement is preferred.

As described above, according to the optical member of an embodiment, an optical member 1 in which degradation of the adhesion between the substrate 2 and the polymer layer 3 caused by moisture absorption is suppressed is obtained because the polymerizable composition that constitutes the polymer layer 3 contains 30 parts by weight or more and 75 parts by weight or less of a polyfunctional acrylate, 25 parts by weight or more and 60 parts by weight or less of a monofunctional monomer having a tertiary amide group, and 0.1 parts by weight or more and 10 parts by weight or less of a fluorine-containing compound having a reactive group. Since the fluorine-containing compound, having a reactive group is contained, the surface energy of the polymer layer 3 can foe decreased and an optical member 1 having excellent water repellency is obtained. Furthermore, since the polymer layer 3 has, on its surface, an indented structure having protrusions 4 formed at a pitch P not greater than the wavelength of visible light, an optical member 1 having excellent anti-reflection properties is obtained.

Figure 2:
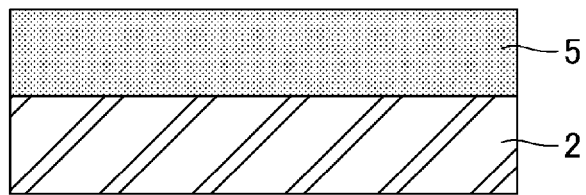
FIG. 2 includes schematic cross-sectional views illustrating a process for manufacturing an optical member according to an embodiment, (steps a to d).
Figure 2:
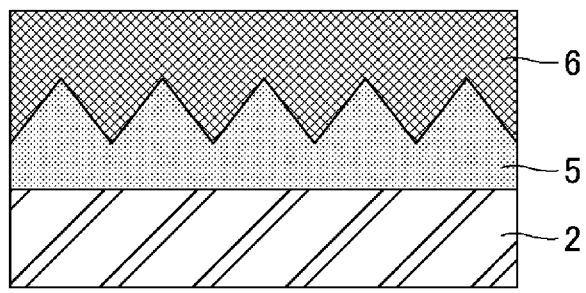
Figure 2:
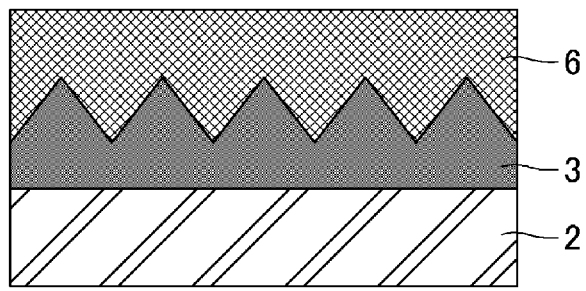
Figure 2:
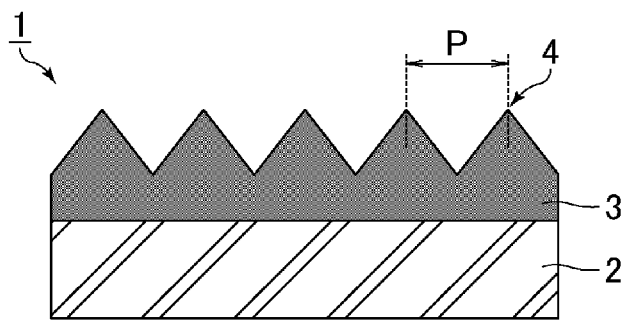

Next, a process for manufacturing the optical member according to an embodiment is described by referring to FIG. 2. FIG. 2 includes schematic cross-sectional views illustrating a process for manufacturing an optical member according to an embodiment (steps a to d).

(a) Applying Polymerizable Composition

First, as illustrated in FIG. 2(a), the polymerizable composition 5 is applied to the substrate 2. As a result, the polymerizable composition 5 is formed in direct contact with the substrate 2. The method for applying the polymerizable composition 5 is not particularly limited, and examples of the method include a spraying method, a gravure method, and a slot die method.

(b) Forming Indented Structure

As illustrated in FIG. 2(b), onto the applied polymerizable composition 5, a mold 6 is pressed against from the side remote from the substrate 2 so as to achieve bonding and to form an indented structure on the surface of the polymerizable composition 5 remote from the substrate 2.

(c) Curing Polymerizable Composition

The polymerizable composition 5 with the indented structure formed thereon is cured by active energy ray irradiation (polymerization). As a result, a polymer layer 3 illustrated in FIG. 2(c) is formed. The active energy ray may be applied from the substrate 2 side or from the polymerizable composition 5 side. The number of times the active energy ray is applied to the polymerizable composition 5 is not particularly limited, and may be one, or more than one.

(d) Separating Mold

The mold 6 is separated from the polymer layer 3. As a result, an optical member 1 illustrated in FIG. 2(d) is completed. The indented structure formed on the surface of the polymer layer 3 corresponds to a structure in which protrusions 4 are formed at a pitch P not greater than the wavelength of visible light, in other words, a moth-eye structure.

For example, a mold prepared by the following method can be used as the mold 6. First, aluminum, which, is the material for the mold 6, is deposited on a supporting substrate by a sputtering method. Next, anodization and etching are alternately repeated on the deposited aluminum layer so as to form a female mold (mold 6) of the moth-eye structure. During this process, the duration of the anodization and the duration of the etching are adjusted to change the indented structure of the mold 6.

The material for the supporting substrate is not particularly limited, and examples of the material include glass; metal materials such as stainless steel and nickel; polyolefin resins such as polypropylene, polymethylpentene, cyclic olefin polymers (representative examples include norbornene resins such as polymers (trade name: ZEONOR (registered trademark)) produced by ZEON CORPORATION and polymers (trade name: ART ON (registered trademark)) produced by JSR Corporation); polycarbonate resins; and resin materials such as polyethylene terephthalate, polyethylene naphthalate, and triacetylcellulose. An aluminum substrate may be used instead of the supporting substrate on which aluminum is deposited.

The shape of the mold 6 is not particularly limited, and examples of the shape include a flat plate shape and a roll shape.

The mold 6 is preferably surface-treated with a releasing agent. In other words, the mold 6 is preferably subjected to a releasing treatment. Performing the releasing treatment on the mold 6 can easily separate the mold 6 from the polymer layer 3 in the step (d) described above. Moreover, the surface energy of the mold 6 can be decreased, and, in the step (b) described above in which the mold 6 is pressed against the polymerizable composition 5, fluorine atoms can smoothly align on the surface of the polymerizable composition 5 remote from the substrate 2. In addition, the fluorine atoms can be prevented from detaching from the surface of the polymerizable composition 5 remote from the substrate 2 before curing the polymerizable composition 5. As a result, in the optical member 1, the fluorine atoms can smoothly align on the surface of the polymer layer 3 remote from the substrate 2.

Examples of the releasing agent include fluorine-, silicon-, and phosphate-ester-based releasing agents, but a fluorine-based releasing agent, is preferable. When a fluorine-based releasing agent is used, the interaction with the fluorine-containing compound in the polymerizable composition 5 is enhanced, and fluorine atoms can more smoothly align on the surface of the polymerizable composition 5 remote from the substrate 2. A known example of the fluorine-based releasing agent is a fluorine-based releasing agent (trade name: OPTOOL AES4) produced by DAIKIN INDUSTRIES, LTD.

In the manufacturing process described above, for example, the steps (a) to (d) can be efficiently continuously carried out when the substrate 2 has a roll shape.

The present invention will now be described in further details through Examples and Comparative Examples which do not limit the present invention.

Example 1

An optical member of Example 1 was manufactured by the following manufacturing process.

(a) Applying Polymerizable Composition

First, the polymerizable composition 5 was applied to the substrate 2 by using a bar coater (trade name: No. 05) produced by Daiichi Rika Co., Ltd. As a result, the polymerizable composition 5 was formed, in direct contact with the substrate 2.

A triacetylcellulose film (trade name: TAC-TD80U) produced by FUJIFLM Holdings Corporation was used as the substrate 2. The thickness of the substrate 2 was 80 μm.

A mixture of a polyfunctional acrylate, a monofunctional monomer, a fluorine-containing compound, and a polymerization initiator described below was used as the polymerizable composition 5. The numeral following the name of the material indicates the content of that material. The polymerizable composition 5 was solventless.

<Polyfunctional Acrylate>

Pentaerythritol Triacrylate: 38.4 Parts by Weight

A polyfunctional acrylate (trade name: A-TMM-3LM-N) produced by Shin-Nakamura Chemical Co., Ltd., was used as the pentaerythritol triacrylate.

Ethoxylated Pentaerythritol Tetraacrylate: 25.6 Parts by Weight

A polyfunctional acrylate (trade name: ATM-35E) produced by Shin-Nakamura Chemical Co., Ltd., was used as the ethoxylated pentaerythritol tetraacrylate.

<Monofunctional Monomer>

N-acryioylmorpholine: 34 Parts by Weight

A monofunctional monomer (trade, name: ACMO) produced, by KJ Chemicals Corporation was used as the N-acryloylmorpholine.

<Fluorine-Containing Compound>

A compound prepared by the following method was used. First, into a separable flask (capacity: 300 ml) equipped with a stirrer, a thermometer, a nitrogen inlet, and a condenser-tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 ours.

2-Perfluorohexylethyl Acrylate: 50 Parts by Weight

A fluorine-containing monomer (trade name: CHEMINOX FAAC-6) produced by UNIMATEC Co., LTD., was used as the 2-perfluorohexylethyl acrylate.

4-Hydroxybutyl Acrylate: 40 Parts by Weight

An ester group-containing monomer (trade name: 4HBA) produced by Nippon Kasei Chemical Co., Ltd., was used as the 4-hydroxybutyl acrylate.

N-acryloylmorpholine: 10 Parts by Weight

A monofunctional monomer (trade name: ACMO) produced by KJ Chemicals Corporation was used as the N-acryloylmorpholine.

Radical Polymerization Initiator: 3.5 Parts by Weight

A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight

A monomer (trade name: Karenz AOI (registered trademark)) produced by SHOWA DEKKO K.K., was used as the 2-isocyanatoethyl acrylate.

1,8-Diazabicyclo[5.4.0]-7-undecene: 0.3 Parts by Weight

A catalyst (product code: D1270) produced by Tokyo Chemical Industry Co., Ltd., was used as the 1,8-diazabicyclo[5.4.0]-7-undecene.

4-Methoxyphenol: 0.1 Parts by Weight

A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound, was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3500, and the fluorine atom concentration in the fluorine-containing compound was 37 wt %. The weight-average molecular weight of the fluorine-containing compound and the fluorine atom concentration in the fluorine-containing compound were measured by the following procedures. Note that these measurements were conducted after measuring the weight before and after the heat treatment described above.

(Weight-Average Molecular Weight of Fluorine-Containing Compound)

A polystyrene-equivalent weight-average molecular weight of the fluorine-containing compound was determined by gel permeation chromatography (GPC). The equipment and conditions employed were as follows. The molecular weight calibration curves were prepared by using standard polystyrene.

Equipment used: chromatography (trade name: SHODEX GPC SYSTEM-11) produced by SHOWA DENKO K.K.

Column: three columns (trade name: TSKgel αMXL) produced by TOSOH CORPORATION

Measurement, temperature: 40° C.

Sample solution: 0.10% dimethylformamide solution of a pigment, surface-treating agent, having a pyrolyzable polar group Injected amount: 100 ml
Detector: refractive index detector
(Fluorine Atom Concentration in fluorine-Containing Compound)

To 100 parts by weight of a solution of the fluorine-containing compound, 0.5 parts by weight of a photopolymerization initiator (trade name: LUCIRIN TPO) produced by BASF was added and dissolved under stirring. Next, the resulting solution was poured into a polytetrafluoroethylene (PTFE) cylindrical frame (diameter: 30 mm, thickness: 1 mm), and ultraviolet light (irradiation dose: 1 J/cm$^2$) was applied to prepare a cylindrical cured product film. Subsequently, a scanning X-ray fluorescence analyzer (trade name: ZSX Primus) produced by Rigaku Corporation was used to measure the intensity of the fluorine atoms in the cured product film (fluorine-containing compound concentration: 50%) described above at an acceleration voltage of 50 kV and a current of 60 mA so as to determine the fluorine atom concentration in the fluorine-containing compound.
<Polymerization Initiator>

Photopolymerization Initiator: 0.5 Parts by Weight
A photopolymerization initiator (trade name: LUCIRIN TPO) produced by BASF was used as the photopolymerization initiator.
(b) Forming Indented Structure Onto the applied polymerizable composition 5, a mold 6 was pressed against from the side remote from the substrate 2 so that bubbles were not formed so as to achieve bonding and to form an indented structure on the surface of the polymerizable composition 5 remote from the substrate 2.

A mold prepared by the following procedure was used as the mold 6. First, aluminum, which was the material for the mold 6, was deposited on a 10 cm square glass substrate by a sputtering method. The thickness of the deposited aluminum layer was 1.0 μm. Next, anodization and etching were alternately repeated on the deposited aluminum layer so as to form an anodization layer in which a large number of small holes (recesses) (the distance between bottom points of adjacent holes was not greater than the wavelength of visible light) were formed. Specifically, anodization, etching, anodization, etching, anodization, etching, anodization, etching, and anodization were sequentially performed (anodization: 5 times, etching: 4 times) so as to form a large number small holes (recesses) each having a shape (tapered shape) that narrowed toward the interior of aluminum. As a result, a mold 6 having an indented structure was obtained. Anodization was conducted by using oxalic acid (concentration: 0.03 wt %) at a liquid temperature of 5° C. and an application voltage of 80 V. Anodization lasted 25 seconds each time. Etching was conducted by using phosphoric acid (concentration: 1 mol/l)) at a liquid temperature of 30° C. Etching lasted 25 minutes each time. The mold 6 was observed with a scanning electron microscope, and it was found that the height of the protrusions was 290 nm. The mold 6 was subjected to a releasing treatment in advance by using a fluorine-based releasing agent (trade name: OPTOOL AES4) produced by DAIKIN INDUSTRIES, LTD.
(c) Curing Polymerizable Composition The polymerizable composition 5 with the indented structure thereon was cured (polymerized) by applying ultraviolet light (irradiation dose: 1 J/cm$^2$) from the substrate 2 side. As a result, the polymer layer 3 was formed. The thickness of the polymer layer 3 was 11.0 μm.

(d) Separating Mold

The mold 6 was separated from the polymer layer 3. As a result, the optical member 1 was obtained. The surface geometry of the optical member 1 was as follows:
Shape of protrusions 4: bell shape
Pitch P of protrusions 4: 200 nm
Height of protrusions 4: 200 nm
   Aspect ratio of protrusions 4: 1

Example 2

An optical member was prepared as in Example 1 except that the monofunctional monomer was changed to N,N-dimethylacrylamide. A monofunctional monomer (trade name: DMAA) produced by KJ Chemicals Corporation was used as the N,N-dimethylacrylamide. The polymerizable composition 5 contained a total of 35 parts by weight of the monofunctional monomer having a tertiary amide group (the sum of 34 parts by weight of N,N-dimethylacrylamide added as a monofunctional monomer and 1 part by weight of N-acryloylmorpholine in the solution of the fluorine-containing compound).

Example 3

An optical member was prepared as in Example 1 except that the monofunctional monomer was changed to N,N-diethylacrylamide. A monofunctional monomer (trade name: DEAA) produced by KJ Chemicals Corporation was used as the N,N-diethylacrylamide. The polymerizable composition 5 contained a total of 35 parts by weight of the monofunctional monomer having a tertiary amide group (the sum of 34 parts by weight of N,N-diethylacrylamide added as a monofunctional monomer and 1 part by weight of N-acryloylmorpholine in the solution of the fluorine-containing compound).

Example 4

An optical member was prepared as in Example 1 except that the polyfunctional acrylate content and the monofunctional monomer content were changed as follows.
<Polyfunctional Acrylate>
   Pentaerythritol triacrylate: 43.8 Parts by Weight
   Ethoxylated Pentaerythritol Tetraacrylate: 29.2 Parts by Weight
<Monofunctional Monomer>
   N-acryloylmorpholine: 25 Parts by Weight
The polymerizable composition 5 contained a total of 26 parts by weight of the monofunctional monomer having a tertiary amide group (the sum of 25 parts by weight of N-acryloylmorpholine added as a monofunctional monomer and 1 part by weight of N-acryloylmorpholine in the solution of the fluorine-containing compound).

Example 5

An optical member was prepared as in Example 1 except that the polyfunctional acrylate content and the monofunctional monomer content were changed as follows.
<Polyfunctional Acrylate>
   Pentaerythritol Triacrylate: 41.4 Parts by Weight
   Ethoxylated Pentaerythritol Tetraacrylate: 27.6 Parts by Weight
<Monofunctional Monomer>
   N-acryloylmorpholine: 29 Parts by Weight
The polymerizable composition 5 contained a total of 30 parts by weight of the monofunctional monomer having a tertiary amide group (the sum of 29 parts by weight of N-acryloylmorpholine added as a monofunctional monomer and 1 part by weight of N-acryloylmorpholine in the solution of the fluorine-containing compound).

Example 6

An optical member was prepared as in Example 1 except that the polyfunctional acrylate content and the monofunctional monomer content were changed as follows.
<Polyfunctional Acrylate>
Pentaerythritol Triacrylate: 24.0 Parts by Weight
Ethoxylated Pentaerythritol Tetraacrylate: 16.0 Parts by Weight
<Monofunctional Monomer>
N-acryloylmorpholine: 58 Parts by Weight
The polymerizable composition 5 contained a total of 59 parts by weight of the monofunctional monomer having a tertiary amide, group (the sum of 58 parts by weight of N-acryloylmorpholine added as a monofunctional monomer and 1 part by weight of N-acryloylmorpholine in the solution of the fluorine-containing compound).

Example 7

An optical member was prepared as in Example 1 except, that, the polyfunctional acrylate content and the monofunctional monomer content were changed as follows.
<Polyfunctional Acrylate>
Pentaerythritol Triacrylate: 27.6 Parts by Weight
Ethoxylated Pentaerythritol Tetraacrylate: 18.4 Parts by Weight
<Monofunctional Monomer>
N-acryloylmorpholine: 52 Parts by Weight
The polymerizable composition 5 contained a total of 53 parts by weight of the monofunctional monomer having a tertiary amide group (the sum of 52 parts by weight of N-acryloylmorpholine added as a monofunctional monomer and 1 part by weight of N-acryloylmorpholine in the solution of the fluorine-containing compound).

Example 8

An optical member was prepared as in Example 1 except that the polyfunctional acrylate content and the fluorine-containing compound content were changed as follows.
<Polyfunctional Acrylate>
Pentaerythritol Triacrylate: 38.9 Parts by Weight
Ethoxylated Pentaerythritol Tetraacrylate: 26.0 Parts by Weight
<Fluorine-Containing Compound>: 0.1 Parts by Weight
In this example, a solution of a fluorine-containing compound to which 1 part by weight of N-acryloylmorpholine was added relative to 0.1 parts by weight of the fluorine-containing compound was prepared. Then, 1.1 parts by weight of the obtained solution of the fluorine-containing compound was added to the polymerizable composition 5, in other words, in terms of solid content, 0.1 part by weight of the fluorine-containing compound was added to the polymerizable composition 5. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 9

An optical member was prepared as in Example 1 except that the polyfunctional acrylate content and the fluorine-containing compound content were changed as follows.
<Polyfunctional Acrylate>
Pentaerythritol Triacrylate: 33.0 Parts by Weight
Ethoxylated Pentaerythritol Tetraacrylate: 22.0 Parts by Weight
<Fluorine-Containing Compounds>: 10 Parts by Weight
In this example, a solution of a fluorine-containing compound in which 1 part by weight of N-acryloylmorpholine was added relative to 10 parts by weight of the fluorine-containing compound was prepared. Then, 11 parts by weight of the obtained solution of the fluorine-containing compound was added to the polymerizable composition 5, in other words, in terms of solid content, 10 part by weight of the fluorine-containing compound was added to the polymerizable composition 5. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 10

An optical member was prepared as in Example 1 except that 1 part by weight of a fluorine-based additive (trade name: MEGAFACE RS-90) produced by DIC Corporation was used as the fluorine-containing compound. The fluorine atom concentration in the fluorine-containing compound was 47 wt %. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 11

An optical member was prepared as in Example 1 except that 1 part by weight of a fluorine-based additive (trade name: FTERGENT 601AD) produced by NEOS Company Limited was used as the fluorine-containing compound. The fluorine atom concentration in the fluorine-containing compound was 21 wt %. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 12

An optical member was prepared as in Example 1 except that the polyfunctional acrylate content and the monofunctional monomer content were changed as follows.
<Polyfunctional Acrylate>
Pentaerythritol Triacrylate: 44.4 Parts by Weight
Ethoxylated Pentaerythritol Tetraacrylate: 29.6 Parts by Weight
<Monofunctional Monomer>
N-acryloylmorpholine: 24 Parts by Weight
The polymerizable composition 5 contained a total of 25 parts by weight of the monofunctional monomer having a tertiary amide group (the sum of 24 parts by weight of N-acryloylmorpholine added as a monofunctional monomer and 1 part by weight of N-acryloylmorpholine in the solution of the fluorine-containing compound).

Example 13

An optical member was prepared as in Example 1 except that the polyfunctional acrylate content and the monofunctional monomer content were changed as follows.
<Polyfunctional Acrylate>
Pentaerythritol Triacrylate: 23.4 Parts by Weight
Ethoxylated Pentaerythritol Tetraacrylate: 5.6 Parts by Weight
<Monofunctional Monomer>
N-acryloylmorpholine: 59 Parts by Weight
The polymerizable composition 5 contained a total of 60 parts by weight of the monofunctional monomer having a tertiary amide group (the sum of 59 parts by weight of N-acryloylmorpholine added as a monofunctional monomer and 1 part by weight of N-acryloylmorpholine in the solution of the fluorine-containing compound).

Example 14

An optical member was prepared as in Example 1 except, that, the polyfunctional acrylate content, the monofunctional monomer content, and the fluorine-containing compound content were changed as follows.
<Polyfunctional Acrylate>
Pentaerythritol Triacrylate: 18.0 Parts by Weight
Ethoxylated Pentaerythritol Tetraacrylate: 12.0 Parts by Weight
<Monofunctional Monomer>
N-acryloylmorpholine: 59 Parts by Weight
<Fluorine-Containing Compound>: 10 Parts by Weight
In this example, a solution of a fluorine-containing compound in which 1 part by weight of N-acryloylmorpholine was added relative to 10 parts by weight of the fluorine-containing compound was prepared. Then, 11 parts by weight of the obtained solution of the fluorine-containing compound was added to the polymerizable composition 5, in other words, in terms of solid content, 10 part by weight of the fluorine-containing compound was added to the polymerizable composition 5. The polymerizable composition 5 contained a total of 60 parts by weight of the monofunctional monomer having a tertiary amide group (the sum of 59 parts by weight of N-acryloylmorpholine added as a monofunctional monomer and 1 part by weight of N-acryloylmorpholine in the solution of the fluorine-containing compound).

Example 15

An optical member was prepared as in Example 1 except that the polyfunctional acrylate content was changed as follows.
<Polyfunctional Acrylate>
Pentaerythritol Triacrylate: 45.0 Parts by Weight
Ethoxylated Pentaerythritol Tetraacrylate: 30.0 Parts by Weight
The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 16

An optical member was prepared as in Example 1 except that the polyfunctional acrylate content and the monofunctional monomer content were changed as follows.
<Polyfunctional Acrylate>
Pentaerythritol Triacrylate: 26.4 Parts by Weight
Ethoxylated Pentaerythritol Tetraacrylate: 17.6 Parts by Weight
<Monofunctional Monomer>
N-acryloylmorpholine: 54 Parts by Weight
The polymerizable composition 5 contained a total of 55 parts by weight of the monofunctional monomer having a tertiary amide group (the sum of 54 parts by weight of N-acryloylmorpholine added as a monofunctional monomer and 1 part by weight of N-acryloylmorpholine in the solution of the fluorine-containing compound).

Example 17

An optical member was prepared as in Example 1 except that the polyfunctional acrylate content and the monofunctional monomer content were changed as follows.
<Polyfunctional Acrylate>
Pentaerythritol Triacrylate: 29.4 Parts by Weight
Ethoxylated Pentaerythritol Tetraacrylate: 19.6 Parts by Weight
<Monofunctional Monomer>
N-acryloylmorpholine: 4.9 Parts by Weight
The polymerizable composition 5 contained a total of 50 parts by weight of the monofunctional monomer having a tertiary amide group (the sum of 49 parts by weight of N-acryloylmorpholine added as a monofunctional monomer and 1 part by weight of N-acryloylmorpholine in the solution of the fluorine-containing compound).

Example 18

An optical member was prepared as in Example 1 except that the polyfunctional acrylate content and the fluorine-containing compound content were changed as follows.
<Polyfunctional Acrylate>
Pentaerythritol Triacrylate: 38.8 Parts by Weight
Ethoxylated Pentaerythritol Tetraacrylate: 25.9 Parts by Weight
<Fluorine-Containing Compound>: 0.3 Parts by Weight
In this example, a solution of a fluorine-containing compound in which 1 part by weight of N-acryloylmorpholine was added relative to 0.3 parts by weight of the fluorine-containing compound was prepared. Then, 1.3 parts by weight of the obtained solution of the fluorine-containing compound was added to the polymerizable composition 5, in other words, in terms of solid content, 0.3 parts by weight of the fluorine-containing compound was added to the polymerizable composition 5. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 19

An optical member was prepared as in Example 1 except that, the polyfunctional acrylate content and the fluorine-containing compound content were changed as follows.

<Polyfunctional Acrylate>
Pentaerythritol Triacrylate: 34.2 Parts by Weight
Ethoxylated Pentaerythritol Tetraacrylate: 22.8 Parts by Weight
<Fluorine-Containing Compounds>: 8 Parts by Weight
In this example, a solution of a fluorine-containing compound in which 1 part by weight of N-acryloylmorpholine was added relative to 8 parts by weight of the fluorine-containing compound was prepared. Then, 9 parts by weight of the obtained solution of the fluorine-containing compound was added to the polymerizable composition 5, in other words, in terms of solid content, 8 parts by weight of the fluorine-containing compound was added to the polymerizable composition 5. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 20

An optical member was prepared as in Example 1 except that the polyfunctional acrylate content and the fluorine-containing compound content were changed as follows.
<Polyfunctional Acrylate>
Pentaerythritol Triacrylate: 38.7 Parts by Weight
Ethoxylated Pentaerythritol Tetraacrylate: 25.8 Parts by Weight
<Fluorine-Containing Compound>: 0.5 Parts by Weight
In this example, a solution of a fluorine-containing compound in which 1 part by weight of N-acryloylmorpholine was added relative to 0.5 parts by weight of the fluorine-containing compound was prepared. Then, 1.5 parts by weight of the obtained solution of the fluorine-containing compound was added to the polymerizable composition 5, in other words, in terms of solid content, 0.5 parts by weight of the fluorine-containing compound was added to the polymerizable composition 5. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 21

An optical member was prepared as in Example 1 except that the polyfunctional acrylate content and the fluorine-containing compound content were changed as follows.
<Polyfunctional Acrylate>
Pentaerythritol Triacrylate: 36.0 Parts by Weight
Ethoxylated Pentaerythritol Tetraacrylate: 24.0 Parts by Weight
<Fluorine-Containing Compound>: 5 Parts by Weight
In this example, a solution of a fluorine-containing compound in which 1 part by weight of N-acryloylmorpholine was added relative to 5 parts by weight of the fluorine-containing compound was prepared. Then, 6 parts by weight of the obtained solution of the fluorine-containing compound was added to the polymerizable composition 5, in other words, in terms of solid content, 5 parts by weight of the fluorine-containing compound was added to the polymerizable composition 5. The polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Example 22

An optical member was prepared as in Example 1 except that a substance prepared by the following method was used as the fluorine-containing compound).

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.

2-Perfluorobutylethyl Acrylate: 23 Parts by Weight
A fluorine-containing monomer (trade name: CHEMINOX FAAC-4) produced by UNIMATEC Co., LTD., was used as the 2-perfluorobutylethyl acrylate.
4-Hydroxybutyl Acrylate: 40 Parts by Weight
An ester group-containing monomer (trade name: 4HBA) produced by Nippon Kasei Chemical Co., Ltd., was used as the 4-hydroxybutyl acrylate.
Normal-butyl Methacrylate: 27 Parts by Weight
Methacrylic acid ester (trade name: BMA) produced by Mitsubishi Rayon Co., Ltd., was used, as the normal-butyl methacrylate
N-acryloylmorpholine: 10 Parts by Weight
A monofunctional monomer (trade name: ACMO) produced by KJ Chemicals Corporation was used as the N-acryloylmorpholine.
Radical Polymerization Enitiator: 3.5 Parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade name: Karenz AOI) produced by SHOWA DENKO K.K., was used as the 2-isocyanatoethyl acrylate.
1,8-Diazabicyclo[5.4.0]-7-undecene: 0.3 Parts by Weight
A catalyst (product, code: D1270) produced by Tokyo Chemical Industry Co., Ltd., was used as the 1,8-diazabicyclo[5.4.0]-7-undecene.
4-Methoxyphenol: 0.1 Parts by Weight
A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: ME-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 4050, and the fluorine atom concentration in the fluorine-containing compound was 18 wt %.

Example 23

An optical member was prepared as in Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.

2-Perfluorobutylethyl Acrylate: 27 Parts by Weight
A fluorine-containing monomer (trade name: CHEMINOX FAAC-4) produced by UNIMATEC Co., LTD., was used as the 2-perfluorobutylethyl acrylate.
4-Hydroxybutyl Acrylate: 40 Parts by Weight
An ester group-containing monomer (trade name: 4HBA) produced by Nippon Kasei Chemical Co., Ltd., was used as the 4-hydroxybutyl acrylate.
Normal-butyl Methacrylate: 23 Parts by Weight
Methacrylic acid ester (trade name: BMA) produced by Mitsubishi Rayon Co., Ltd., was used as the normal-butyl methacrylate
N-acryloylmorpholine: 10 Parts by Weight
A monofunctional monomer (trade name: ACMO) produced by KJ Chemicals Corporation was used as the N-acryloylmorpholine.
Radical Polymerization Enitiator: 3.5 Parts by Weight
A polymerization initiator (trade name: V-601) produced by Wako Pure Chemical Industries, Ltd., was used as the radical polymerization Initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade, name: Karenz AOI) produced by SHOWA DENKO K.K., was used as the 2-isocyanatoethyl acrylate.
1,8-Diazabicyclo[5.4.0]-7-undecene: 0.3 Parts by Weight
A catalyst (product code: D1270) produced by Tokyo Chemical Industry Co., Ltd., was used as the 1,8-diazabicyclo[5.4.0]-7-undecene.
4-Methoxyphenol: 0.1 Parts by Weight
A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3850, and the fluorine atom concentration in the fluorine-containing compound was 20 wt %.

Example 24

An optical member was prepared as in Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask drop-wise over 3 hours.

2-Perfluorohexylethyl Acrylate: 85 Parts by Weight
A fluorine-containing monomer (trade name: CHEMINOX. FAAC-6) produced by UNIMATEC Co., LTD., was used as the 2-perfluorohexylethyl acrylate.
4-Hydroxybutyl Acrylate: 10 Parts by Weight
An ester group-containing monomer (trade name: 4HBA) produced by Nippon Kasei Chemical Co., Ltd., was used as the 4-hydroxybutyl acrylate.
N-acryloylmorpholine: 5 Parts by Weight
A monofunctional monomer (trade name: ACMO) produced by KJ Chemicals Corporation was used as the N-acryloylmorpholine.
Radical Polymerization Initiator: 3.5 Parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate; 5 Parts by Weight
A monomer (trade name: Karenz AOI) produced by SHOWA DENKO K.K., was used as the 2-isocyanatoethyl acrylate.

1,8-Diazabicyclo[5.4.0]-7-undecene: 0.3 Parts by Weight
A catalyst (product code: D1270) produced by Tokyo Chemical Industry Co., Ltd., was used as the 1,8-diazabicyclo[5.4.0]-7-undecene.

4-Methoxyphenol: 0.1 Parts by Weight
A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name; N-1110 type) produced by TOKYO RIKAKIKAI CO., LTD. Then a heat treatment at 180° C. was conducted for 5 hours by using a mini jet oven (trade name: MD-92) produced by Toyanta Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added, to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3150, and the fluorine atom concentration in the fluorine-containing compound was 52 wt %.

Example 25

An optical member was prepared as in Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while, the temperature of the inside space was maintained at 110° C., the mixture of the materials described below was added to the separable flask dropwise over 3 hours.

2-Perfluorohexylethyl Acrylate: 82 Parts by Weight
A fluorine-containing monomer (trade name: CHEMINOX FAAC-6) produced by UNIMATEC Co., LTD., was used as the 2-perfluorohexylethyl acrylate.

4-Hydroxybutyl Acrylate: 13 Parts by Weight
An ester group-containing monomer (trade name: 4HBA) produced by Nippon Kasei Chemical Co., Ltd., was used as the 4-hydroxybutyl acrylate.

N-acryloylmorpholine: 5 Parts by Weight
A monofunctional monomer (trade name: ACMO) produced by KJ Chemicals Corporation was used as the N-acryloylmorpholine.

Radical Polymerization Initiator: 3.5 Parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade name: Karenz AOI) produced by SHOWA DENKO K.K., was used as the 2-isocyanatoethyl acrylate.

1,8-Diazabicyclo[5.4.0]-7-undecene: 0.3 Parts by Weight
A catalyst (product code: D1270) produced by Tokyo Chemical Industry Co., Ltd., was used as the 1,8-diazabicyclo[5.4.0]-7-undecene.

4-Methoxyphenol: 0.1 Parts by Weight
A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound, was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3200, and the fluorine atom concentration in the fluorine-containing compound was 50 wt %.

Example 26

An optical member was prepared as In Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.

2-Perfluorobutylethyl Acrylate: 35 Parts by Weight
A fluorine-containing monomer (trade name: CHEMINOX FAAC-4) produced by UNIMATEC Co., LTD., was used as the 2-perfluorobutylethyl acrylate.

4-Hydroxybutyl Acrylate: 40 Parts by Weight
An ester group-containing monomer (trade name: 4HBA) produced by Nippon Kasei Chemical Co., Ltd., was used as the 4-hydroxybutyl acrylate.

Normal-butyl Methacrylate: 15 Parts by Weight
Methacrylic acid ester (trade name: BMA) produced by Mitsubishi Rayon Co., Ltd., was used as the normal-butyl methacrylate N-acryloylmorpholine: 10 Parts by Weight
A monofunctional monomer (trade name: ACMO) produced by KJ Chemicals Corporation was used as the N-acryloylmorpholine.

Radical Polymerization Enitiator: 3.5 Parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade name: Karenz AOI) produced by SHOWA DENKO K.K., was used as the 2-isocyanatoethyl acrylate.

1,8-Diazabicyclo[5.4.0]-7-undecene: 0.3 Parts by Weight
A catalyst (product code: D1270) produced by Tokyo Chemical Industry Co., Ltd., was used as the 1,8-diazabicyclo[5.4.0]-7-undecene.

4-Methoxyphenol: 0.1 Parts by Weight
A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name; MD-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3740, and the fluorine atom concentration in the fluorine-containing compound was 25 wt %.

Example 27

An optical member was prepared as in Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.

2-Perfluorohexylethyl Acrylate: 65 Parts by Weight
A fluorine-containing monomer (trade name; CHEMINOX FAAC-6) produced by UNIMATEC Co., LTD., was used as the 2-perfluorohexylethyl acrylate.

4-Hydroxybutyl Acrylate: 30 Parts by Weight
An ester group-containing monomer (trade name: 4HBA) produced by Nippon Kasei Chemical Co., Ltd., was used as the 4-hydroxybutyl acrylate.

N-acryloylmorpholine: 5 Parts by Weight
A monofunctional monomer (trade name: ACMO) produced by KJ Chemicals Corporation was used as the N-acryloylmorpholine.

Radical Polymerization Initiator: 3.5 parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade name: Karenz AOI) produced by SHOWA DENKO K.K., was used as the 2-isocyanatoethyl acrylate.

1,8-Diazabicyclo[5.4.0]-7-undecene: 0.3 Parts by Weight
A catalyst (product code: D1270) produced by Tokyo Chemical Industry Co., Ltd., was used as the 1,8-diazabicyclo[5.4.0]-7-undecene.

4-Methoxyphenol: 0.1 Parts by Weight
A polymerization inhibitor (product code: M0123) produced by Tokyo Chemical Industry Co., Ltd., was used as the 4-methoxyphenol.

Upon completion of the reaction, solvent, substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3260, and the fluorine, atom concentration in the fluorine-containing compound was 45 wt %.

Example 28

An optical member was prepared as in Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.

2-Perfluorohexylethyl Acrylate: 45 Parts by Weight
A fluorine-containing monomer (trade name: CHEMINOX FAAC-6) produced by UNIMATEC Co., LTD., was used as the 2-perfluorohexylethyl acrylate.
2-Perfluorobutylethyl Acrylate: 40 Parts by Weight
A fluorine-containing monomer (trade name: CHEMINOX FAAC-4) produced by UNIMATEC Co., LTD., was used as the 2-perfluorobutylethyl acrylate.
Normal-butyl Methacrylate: 10 Parts by Weight
Methacrylic acid ester (trade name: BMA) produced by Mitsubishi Rayon Co., Ltd., was used as normal-butyl methacrylate
N-acryloylmorpholine: 5 Parts by Weight
A monofunctional monomer (trade name: ACMO) produced by KJ Chemicals Corporation was used as the N-acryloylmorpholine.
Radical Polymerization Initiator: 3.5 Parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade name: Karenz AOI) produced by SHOWA DENKO K.K., was used as the 2-isocyanatoethyl acrylate.
1,8-Diazabicyclo[5.4.0]-7-undecene: 0.3 Parts by Weight
A catalyst (product code: D1270) produced by Tokyo Chemical Industry Co., Ltd., was used as the 1,8-diazabicyclo[5.4.0]-7-undecene.
4-Methoxyphenol: 0.1 Parts by Weight
A polymerization Inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyanta Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3420, and the fluorine atom concentration in the fluorine-containing compound was 30 wt %.

Example 29

An optical member was prepared as in Example 1 except that a substance prepared by the following method was used as the fluorine-containing compound.

First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.

2-Perfluorohexylethyl Acrylate: 53 Parts by Weight
A fluorine-containing monomer (trade name: CHEMINOX FAAC-6) produced by UNIMATEC Co., LTD., was used as the 2-perfluorohexylethyl acrylate.
4-Hydroxybutyl Acrylate: 37 Parts by Weight
An ester group-containing monomer (trade name: 4HBA) produced by Nippon Kasei Chemical Co., Ltd., was used as the 4-hydroxybutyl acrylate.
N-acryloylmorpholine: 10 Parts by Weight
A monofunctional monomer (trade name: ACMO) produced by KJ Chemicals Corporation was used as the N-acryloylmorpholine.
Radical Polymerization Initiator: 3.5 Parts by Weight
A polymerization initiator (trade name: V-601) produced by Wako Pure Chemical Industries, Ltd., was used as the radical polymerization initiator.

After dropwise addition, to the resulting reaction solution, 0.1 parts by weight of the same radical polymerization initiator was further added, and the reaction was conducted for 5 hours. To the resulting resin in a molten state, the following materials were added, and the reaction was conducted for 2 hours in a 70° C. environment.

2-Isocyanatoethyl Acrylate: 5 Parts by Weight
A monomer (trade name: Karenz AOI) produced by SHOWA DENKO K.K., was used as the 2-isocyanatoethyl acrylate.
1,8-Diazabicyclo[5.4.0]-7-undecene: 0.3 Parts by Weight
A catalyst (product, code: D1270) produced by Tokyo Chemical Industry Co., Ltd., was used as the 1,8-diazabicyclo[5.4.0]-7-undecene.
4-Methoxyphenol: 0.1 Parts by Weight
A polymerization Inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyama Sangyo Co., Ltd. After the heat treatment, N-acryloylmorpholine was added to prepare a solution (solution of fluorine-containing compound) having a solid component (fluorine-containing compound) concentration adjusted to 50%.

In this example, 2 parts by weight of the obtained solution of the fluorine-containing compound was added to the polymerizable composition 5, in other words, in terms of solid content, 1 part by weight of the fluorine-containing compound was added to the polymerizable composition 5. Moreover, as is clear from the description above, the polymerizable composition 5 contained 1 part by weight of N-acryloylmorpholine in the solution of the fluorine-containing compound. In other words, the polymerizable composition 5 contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound). The weight-average molecular weight of the fluorine-containing compound was 3530, and the fluorine atom concentration in the fluorine-containing compound was 40 wt %.

Comparative Example 1

An optical member was prepared as in Example 1 except that the polyfunctional acrylate content and the monofunctional monomer content were changed as follows.
<Polyfunctional Acrylate>
  Pentaerythritol Triacrylate: 59.4 Parts by Weight
  Ethoxylated Pentaerythritol Tetraacrylate: 39.6 Parts by Weight
<Monofunctional Monomer>: 0 Parts by Weight
The polymerizable composition contained 1 part by weight of the monofunctional monomer having a tertiary amide group (1 part by weight of N-acryloylmorpholine in the solution of the fluorine-containing compound).

Comparative Example 2

An optical member was prepared as in Example 1 except that the polyfunctional acrylate content and the monofunctional monomer content were changed as follows.
<Polyfunctional Acrylate>
  Pentaerythritol Triacrylate: 48.0 Parts by Weight
  Ethoxylated Pentaerythritol Tetraacrylate: 32.0 Parts by Weight
<Monofunctional Monomer>
  N-acryloylmorpholine: 19 Parts by Weight
The polymerizable composition contained a total of 20 parts by weight of the monofunctional monomer having a tertiary amide group (the sum of 19 parts by weight of N-acryloylmorpholine added as a monofunctional monomer and 1 part by weight of N-acryloylmorpholine in the solution of the fluorine-containing compound).

Comparative Example 3

An optical member was prepared as in Example 1 except that the polyfunctional acrylate content and the monofunctional monomer content were changed as follows.

<Polyfunctional Acrylate>
  Pentaerythritol Triacrylate: 21.0 Parts by Weight
  Ethoxylated Pentaerythritol Tetraacrylate: 14.0 Parts by Weight
<Monofunctional Monomer>
  N-acryloylmorpholine: 64 Parts by Weight
The polymerizable composition contained a total of 65 parts by weight of the monofunctional monomer having a tertiary amide group (the sum of 64 parts by weight of N-acryloylmorpholine added as a monofunctional monomer and 1 part by weight of N-acryloylmorpholine in the solution of the fluorine-containing compound).

Comparative Example 4

An optical member was prepared as in Example 1 except that 34 parts by weight of hydroxyethyl acrylamide having a secondary amide group was used instead of the monofunctional monomer. An amide group-containing monomer (trade name: HEAA (registered trademark)) produced by KJ Chemicals Corporation was used as the hydroxyethyl acrylamide. The polymerizable composition contained 1 part by weight of the monofunctional monomer having a tertiary amide group (1 part by weight of N-acryloylmorpholine in the solution of the fluorine-containing compound).

Comparative Example 5

An optical member was prepared as in Example 1 except, that 34 parts by weight of N-n-butoxymethylacrylamide having a secondary amide group was used instead of the monofunctional monomer. An amide group-containing monomer (trade name: NBMA) produced by MRC UNITEC Co., Ltd., was used as the N-n-butoxymethylacrylamide. The polymerizable composition contained 1 part by weight of the monofunctional monomer having a tertiary amide group (1 part by weight of N-acryloylmorpholine in the solution of the fluorine-containing compound).

Comparative Example 6

An optical member was prepared as in Example 1 except that 34 parts by weight of N-isopropylacrylamide having a secondary amide group was used instead of the monofunctional monomer. An amide group-containing monomer (trade name: NIPAM (registered trademark)) produced by KJ Chemicals Corporation was used as the N-isopropylacrylamide. The polymerizable composition contained 1 part by weight of the monofunctional monomer having a tertiary amide group (1 part by weight of N-acryloylmorpholine in the solution of the fluorine-containing compound).

Comparative Example 7

An optical member was prepared as in Example 1 except that 34 parts by weight of acrylamide having a primary amide group was used instead of the monofunctional monomer. An amide group-containing monomer (product code: A1132) produced by Tokyo Chemical Industry Co., Ltd., was used as the acrylamide. The polymerizable composition contained 1 part by weight of the monofunctional monomer having a tertiary amide group (1 part by weight of N-acryloylmorpholine in the solution of the fluorine-containing compound).

Comparative Example 8

An optical member was prepared as in Example 1 except that 34 parts by weight of 4-hydroxybutyl acrylate having a primary hydroxyl group was used instead of the monofunctional monomer. An ester group-containing monomer (trade name: 4HBA) produced by Nippon Kasei Chemical Co., Ltd., was used as the 4-hydroxybutyl acrylate. The polymerizable composition contained 1 part by weight of the monofunctional monomer having a tertiary amide group (1 part by weight of N-acryloylmorpholine in the solution of the fluorine-containing compound).

Comparative Example 9

An optical member was prepared as in Example 1 except that 34 parts by weight of 1,4-cyclohexanedimethanol monoacrylate having a primary hydroxyl group was used instead of the monofunctional monomer. An ester group-containing monomer (trade name: CHDMMA) produced by Mitsubishi Chemical Corporation was used as the 1,4-cyclohexanedimethanol monoacrylate. The polymerizable composition contained 1 part by weight of the monofunctional monomer having a tertiary amide group (1 part by weight of N-acryloylmorpholine in the solution of the fluorine-containing compound).

Comparative Example 10

An optical member was prepared as in Example 1 except that, the polyfunctional acrylate content, the monofunctional monomer content, and the fluorine-containing compound content were changed as follows.
<Polyfunctional Acrylate>
  Pentaerythritol Triacrylate: 39.0 Parts by Weight
  Ethoxylated Pentaerythritol Tetraacrylate: 26.0 Parts by Weight
<Monofunctional Monomer>
N-acryloylmorpholine: 35 Parts by Weight
<Fluorine-Containing Compound>: 0 Parts by Weight
The polymerizable composition contained 35 parts by weight of the monofunctional monomer having a tertiary amide group (35 parts by weight of N-acryloylmorpholine added as a monofunctional monomer), and did not contain a fluorine-containing compound having a reactive group.

Comparative Example 11

An optical member was prepared as in Example 1 except that the polyfunctional acrylate content and the fluorine-containing compound content were changed as follows.
<Polyfunctional Acrylate>
  Pentaerythritol Triacrylate: 30.0 Parts by Weight
  Ethoxylated Pentaerythritol Tetraacrylate: 20.0 Parts by Weight
<Fluorine-Containing Compound>: 15 Parts by Weight
In this comparative example, a solution of a fluorine-containing compound in which 1 part by weight of N-acryloylmorpholine was added relative to 15 parts by weight of the fluorine-containing compound was prepared. Then, 16 parts by weight of the obtained solution of the fluorine-containing compound was added to the polymerizable composition, in other words, in terms of solid content, 15 parts by weight of the fluorine-containing compound was added to the polymerizable composition. The polymerizable composition contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Comparative Example 12

An optical member was prepared as in Example 1 except that the monofunctional monomer content was changed to 35 parts by weight and 1 part by weight of a silicon-based surface adjuster (trade name: BYK-UV3500) produced by BYK Japan KK, described in PTL 4 described above was used Instead of the fluorine-containing compound. The polymerizable composition contained 35 parts by weight of the monofunctional monomer having a tertiary amide group (35 parts by weight of N-acryloylmorpholine added as a monofunctional monomer), and did not contain a fluorine-containing compound having a reactive group.

Comparative Example 13

An optical member was prepared as in Example 1 except that the monofunctional monomer content was changed to 35 parts by weight and 1 part by weight of a fluorine-based surfactant (trade name: MEGAFACE R-08) produced by DIC Corporation not containing any reactive group and described in PTL 8 described above was used instead of the fluorine-containing compound. The fluorine atom concentration in the fluorine-based surfactant was 31 wt %. The polymerizable composition contained 35 parts by weight of the monofunctional monomer having a tertiary amide group (35 parts by weight of N-acryloylmorpholine added as a monofunctional monomer), and did not contain a fluorine-containing compound having a reactive group.

Comparative Example 14

An optical member was prepared as in Example 1 except that a fluorine-based additive free of a reactive group and prepared by the following procedure was used instead of the fluorine-containing compound.
First, into a separable flask (capacity: 300 ml) equipped with a stirrer, a thermometer, a nitrogen inlet, and a condenser tube, 100 parts by weight of butyl acetate was placed. Next, the separable flask was heated in a nitrogen atmosphere, and while the temperature of the inside space was maintained at 110° C., the mixture of the materials described below was added to the separable flask dropwise over 3 hours.
  2-Perfluorohexylethyl Acrylate: 50 Parts by Weight
A fluorine-containing monomer (trade name: CHEMINOX FAAC-6) produced by UNIMATEC Co., LTD., was used as the 2-perfluorohexylethyl acrylate.
  4-Hydroxybutyl Acrylate: 40 Parts by Weight
An ester group-containing monomer (trade name: 4HBA) produced by Nippon Kasei Chemical Co., Ltd., was used as the 4-hydroxybutyl acrylate.
  N-acryloylmorpholine: 10 Parts by Weight
A monofunctional monomer (trade name: ACMO) produced by KJ Chemicals Corporation was used as the N-acryloylmorpholine.
  Radical Polymerization Initiator: 3.5 Parts by Weight
A polymerization initiator (trade name: V-601) produced by Wako Pure Chemical Industries, Ltd., was used as the radical polymerization initiator.
After dropwise addition, to the resulting reaction solution, 0.1 arts by weight of the same radical polymerization initiator was further added, and the reaction was conducted for 5 hours. To the resulting resin in a molten state, the following materials were added, and the reaction was conducted for 2 hours in a 70° C. environment.

1,8-Diazabicyclo[5.4.0]-7-undecene: 0.3 Parts by Weight

A catalyst (product code: D1270) produced by Tokyo Chemical Industry Co., Ltd., was used as the 1,8-diazabicyclo[5.4.0]-7-undecene.

4-Methoxyphenol: 0.1 Parts by Weight

A polymerization inhibitor (product code: M0123) produced by Tokyo Chemical Industry Co., Ltd., was used as the 4-methoxyphenol.

Upon completion of the reaction, solvent substitution for butyl acetate and N-acryloylmorpholine was performed by using a rotary evaporator (trade name: N-1110 type) produced by TOKYO RIKAKIKAI CO., LTD. Then a heat treatment at 180° C. was conducted for 5 hours by using a mini jet oven (trade name: MD-92) produced by Toyama Sangyo Co., Ltd. After the heat treatment, N-acryloylmorpholine was added to prepare a solution (solution of fluorine-based additive) having a solid component (fluorine-based additive) concentration adjusted to 50%.

In this comparative example, 2 parts by weight of the obtained solution of the fluorine-based additive was added to the polymerizable composition, in other words, in terms of solid content, 1 part by weight of the fluorine-based additive added to the polymerizable composition. Moreover, as is clear from the description above, the polymerizable composition contained 1 part by weight of N-acryloylmorpholine in the solution of the fluorine-based additive. In other words, the polymerizable composition contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-based additive), and did not contain a fluorine-containing compound having a reactive group. The weight-average molecular weight of the fluorine-based, additive was 3200, and the fluorine atom concentration in the fluorine-based additive was 40 wt %.

Comparative Example 15

An optical member was prepared as in Example 1 except that, the polyfunctional acrylate content and the monofunctional monomer content were changed as follows,
<Polyfunctional Acrylate>
Pentaerythritol Triacrylate: 45.6 Parts by Weight
Ethoxylated Pentaerythritol Tetraacrylate: 30.4 Parts by Weight
<Monofunctional Monomer>
N-acryloylmorpholine: 22 Parts by Weight
The polymerizable composition contained a total of 23 parts by weight of the monofunctional monomer having a tertiary amide group (the sum of 22 parts by weight of N-acryloylmorpholine added as a monofunctional monomer and 1 part by weight of N-acryloylmorpholine in the solution of the fluorine-containing compound).

Comparative Example 16

An optical member was prepared as in Example 1 except, that the polyfunctional acrylate content and the monofunctional monomer content were changed as follows.

<Polyfunctional Acrylate>
Pentaerythritol Triacrylate: 21.6 Parts by Weight
Ethoxylated Pentaerythritol Tetraacrylate: 14.4 Parts by Weight
<Monofunctional Monomer>
N-acryloylmorpholine: 62 Parts by Weight
The polymerizable composition contained a total of 63 parts by weight of the monofunctional monomer having a tertiary amide group (the sum of 62 parts by weight of N-acryloylmorpholine added as a monofunctional monomer and 1 part by weight of N-acryloylmorpholine in the solution of the fluorine-containing compound).

Comparative Example 17

An optical member was prepared as in Example 1 except that the polyfunctional acrylate content and the fluorine-containing compound content were changed as follows.
<Polyfunctional Acrylate>
Pentaerythritol Triacrylate: 39.0 Parts by Weight
Ethoxylated Pentaerythritol Tetraacrylate: 26.0 Parts by Weight
<Fluorine-Containing Compound>: 0.07 Parts by Weight
In this comparative example, a solution of a fluorine-containing compound in which 1 part by weight of N-acryloylmorpholine was added relative to 0.07 parts by weight of the fluorine-containing compound, was prepared. Then, 1.07 parts by weight of the obtained solution of the fluorine-containing compound was added to the polymerizable composition, in other words, in terms of solid content, 0.07 part by weight of the fluorine-containing compound was added to the polymerizable composition. The polymerizable composition contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Comparative Example 18

An optical member was prepared as in Example 1 except that the polyfunctional acrylate content and the fluorine-containing compound content were changed as follows.
<Polyfunctional Acrylate>
Pentaerythritol Triacrylate: 31.8 Parts by Weight
Ethoxylated Pentaerythritol Tetraacrylate: 21.2 Parts by Weight
<Fluorine-Containing Compound>: 12 Parts by Weight
In this comparative example, a solution of a fluorine-containing compound in which 1 part by weight of N-acryloylmorpholine was added relative to 12 parts by weight of the fluorine-containing compound was prepared. Then, 13 parts by weight; of the obtained solution of the fluorine-containing compound was added to the polymerizable composition, in other words, in terms of solid content, 12 part by weight of the fluorine-containing compound was added to the polymerizable composition. The polymerizable composition contained a total of 35 parts by weight of the monofunctional monomer having a tertiary amide group (the sum of 34 parts by weight of N-acryloylmorpholine added as a monofunctional monomer and 1 part by weight of N-acryloylmorpholine in the solution of the fluorine-containing compound).

Comparative Example 19

An optical member was prepared as in Example 1 except, that, the polyfunctional acrylate content, the monofunctional monomer content, and the fluorine-containing compound content were changed as follows.
<Polyfunctional Acrylate>
  Pentaerythritol Triacrylate: 16.8 Parts by Weight
  Ethoxylated Pentaerythritol Tetraacrylate: 11.2 Parts by Weight
<Monofunctional Monomer>
  N-acryloylmorpholine: 59 Parts by Weight
<Fluorine-Containing Compound>: 12 Parts by Weight
In this comparative example, a solution of a fluorine-containing compound in which 1 part by weight of N-acryloylmorpholine was added relative to 12 parts by weight of the fluorine-containing compound was prepared. Then, 13 parts by weight of the obtained solution of the fluorine-containing compound was added to the polymerizable composition, in other words, in terms of solid content, 12 part by weight of the fluorine-containing compound was added to the polymerizable composition. The polymerizable composition contained a total of 60 parts by weight of the monofunctional monomer having a tertiary amide group (the sum of 59 parts by weight of N-acryloylmorpholine added as a monofunctional monomer and 1 part by weight of N-acryloylmorpholine in the solution of the fluorine-containing compound).

Comparative Example 20

An optical member was prepared as in Example 1 except that the polyfunctional acrylate content, the monofunctional monomer content, and the fluorine-containing compound content were changed as follows.
<Polyfunctional Acrylate>
  Pentaerythritol Triacrylate: 46.14 Parts by Weight
  Ethoxylated Pentaerythritol Tetraacrylate: 30.76 Parts by Weight
<Monofunctional Monomer>
  N-acryloylmorpholine: 22 Parts by Weight
<Fluorine-Containing Compound>: 0.1 Parts by Weight
In this, comparative example, a solution of a fluorine-containing compound in which 1 part by weight of N-acryloylmorpholine was added relative to 0.1 parts by weight of the fluorine-containing compound was prepared. Then, 1.1 parts by weight of the obtained solution of the fluorine-containing compound was added to the polymerizable composition, in other words, in terms of solid content, 0.1 part by weight of the fluorine-containing compound was added to the polymerizable composition. The polymerizable composition contained a total of 23 parts by weight of the monofunctional monomer having a tertiary amide group (the sum of 22 parts by weight of N-acryloylmorpholine added as a monofunctional monomer and 1 part by weight of N-acryloylmorpholine in the solution of the fluorine-containing compound).
[Evaluation of Optical Member]

Optical members of Examples 1 to 29 and Comparative Examples 1 to 20 were evaluated in terms of the adhesion between the substrate and the polymer layer at normal temperature and normal humidity, the adhesion at high temperature and high humidity, and water repellency. The results are shown in Tables 1 and 2. Evaluation of the adhesion at high temperature and high humidity was conducted to simulate the environment in which moisture absorption more readily occurs.

The adhesion at normal temperature and normal humidity was evaluated by the following procedure. For the optical members of all examples, a surface of the polymer layer-remote from the substrate (the surface having an indented structure) was wiped back and forth 100 times with a wipe (trade name: Elleair ProWipe Soft Micro Wiper S220) produced by DAIO PAPER CORPORATION. Subsequently, each of the optical members of the examples was left to stand in an environment at a temperature of 23° C. and a humidity of 50% for 3 days. Next, the surface of the polymer layer remote from the substrate is incised with a cutting knife to form a grid composed of 11 vertical incision lines and 11 horizontal incision lines having 1 mm intervals. As a result, 100 squares (1 mm squares) was incised. A polyester adhesive tape (trade name: No. 31B) produced by NITTO DENKO CORPORATION was press-bonded to the square portion and peeled in a direction 90° with respect to the surface of the square portion at a speed of 100 mm/s. The peeled state of the polymer layer on the substrate was observed with naked eye, and the number of squares from which the polymer layer on the substrate, detached was counted. The results are indicated by "X/100" (X represents the number of squares from which the polymer layer on the substrate detached). The evaluation standard was as follows.
Level A: Detachment did not occur in any of 100 squares (0/100).
Level B: Detachment occurred in one or more and 99 or less squares among 100 squares (1/100 to 99/100).
Level C: Detachment occurred in all 100 squares (100/100).
The case in which the level A rating was given was assumed to be at a practicable level (high adhesion at normal temperature and normal humidity).

The adhesion at high temperature and high humidity was evaluated by the following procedure. For the optical members of all examples, a surface of the polymer layer remote from the substrate (the surface having an indented structure) was wiped back and forth 100 times with a wipe (trade name: Elleair ProWipe Soft Micro Wiper S220) produced by DAIO PAPER CORPORATION. Subsequently, each of the optical members of the examples was left to stand in an environment, at a temperature of 60° C. and a humidity of 95% for 3 days and then in an environment at a temperature of 23° C. and a humidity of 5%; for one day. Next, the surface of the polymer layer remote from the substrate is incised with a cutting knife, to form a grid composed of 11 vertical incision lines and 11 horizontal incision lines having 1 mm intervals. As a result, 100 squares (1 mm squares) was incised. A polyester adhesive tape (trade name; No. 31B) produced by NITTO DEKKO CORPORATION was press-bonded to the square portion and peeled in a direction 90° with respect to the surface of the square portion at a speed of 100 mm/s. The peeled state of the polymer layer on the substrate was observed with naked eye, and the number of squares from which the polymer layer on the substrate detached was counted. The results are indicated by "X/100" (X represents the number of squares from which the polymer layer on the substrate detached). The evaluation standard was as follows.
Level a: Detachment did not occur in any of 100 squares (0/100).
Level b: Detachment occurred in 1 or 2 squares among 100 squares (1/100 to 2/100).
Level c: Detachment occurred in 3 or more and 5 or less squares among 100 squares (3/100 to 5/100).
Level d: Detachment occurred in 6 or more and 99 or less squares among 100 squares (6/100 to 99/100).
Level e: Detachment, occurred in all 100 squares (100/100).
The case in which the level a, b, or c rating was given was assumed to be at a practicable level (high adhesion at high temperature and high humidity).

Comprehensive evaluation of adhesion was conducted as follows on the basis of the evaluation results of the adhesion at normal temperature and normal humidity and the adhesion at high temperature and high humidity given by the procedures described above.

Excellent: The adhesion at normal temperature and normal humidity was at the level A and the adhesion at high temperature and high humidity was at the level a.
Good: The adhesion at normal temperature and normal humidity was at the level A and the adhesion at high temperature and high humidity was at the level b.
Fair: The adhesion at normal temperature and normal humidity was at the level A and the adhesion at high temperature and high humidity was at the level c.
Poor: The adhesion at normal temperature and normal humidity was at the level A or B, and the adhesion at high temperature and high humidity was at the level d or e.
Very poor: The adhesion at normal temperature and normal humidity was at the level C and the adhesion at high temperature and high humidity was at the level e.

The case in which the comprehensive evaluation was excellent, good, or fair was assumed to be at the practicable level.

For each of the optical members of all examples, the water repellency was evaluated on the basis of the water contact angle with respect to the surface of the polymer layer remote from the substrate (the surface having the indented structure). Specifically, for the optical members of all examples, the surface of the polymer layer remote from the substrate was wiped back and forth 100 times with a wipe (trade name: Elleair ProWipe Soft Micro Wiper S220) produced by DAIO PAPER CORPORATION. Subsequently, for the optical members of all examples, a black acryl plate was attached to the surface of the substrate remote from the polymer layer, and 10 µl of water was dropped onto the surface of the polymer layer remote from the substrate. After 20 seconds, the contact angle was measured at 10 points at 1 second intervals. The same procedure was conducted at a total of 3 positions while changing the position of dropping water, and the average of the contact angles (10 points×3 positions=total of 30 points) was calculated. The first point of measurement selected was the center portion of the surface of the polymer layer remote from the substrate. The second and third points of measurement were, respectively, points 10 mm distant from the first measurement point and were in point-symmetry to each other with respect to the first measurement point. A contact angle measuring instrument (trade name: DSA10-Mk2) produced by Kruss GmbH was used to measure the contact angle.

TABLE 1

| | Adhesion | | | | | Water repellency |
|---|---|---|---|---|---|---|
| | Normal temperature and normal humidity | | High temperature and high humidity | | Comprehensive | Water contact |
| | Result | Evaluation | Result | Evaluation | evaluation | angle (°) |
| Example 1 | 0/100 | Level A | 0/100 | Level a | Excellent | 85 |
| Example 2 | 0/100 | Level A | 0/100 | Level a | Excellent | 87 |
| Example 3 | 0/100 | Level A | 0/100 | Level a | Excellent | 84 |
| Example 4 | 0/100 | Level A | 4/100 | Level c | Fair | 79 |
| Example 5 | 0/100 | Level A | 1/100 | Level b | Good | 81 |
| Example 6 | 0/100 | Level A | 5/100 | Level c | Fair | 92 |
| Example 7 | 0/100 | Level A | 2/100 | Level b | Good | 90 |
| Example 8 | 0/100 | Level A | 4/100 | Level c | Fair | 82 |
| Example 9 | 0/100 | Level A | 2/100 | Level b | Good | 88 |
| Example 10 | 0/100 | Level A | 1/100 | Level b | Good | 93 |
| Example 11 | 0/100 | Level A | 2/100 | Level b | Good | 80 |
| Example 12 | 0/100 | Level A | 5/100 | Level c | Fair | 81 |
| Example 13 | 0/100 | Level A | 5/100 | Level c | Fair | 93 |
| Example 14 | 0/100 | Level A | 4/100 | Level c | Fair | 97 |
| Example 15 | 0/100 | Level A | 4/100 | Level c | Fair | 83 |
| Example 16 | 0/100 | Level A | 2/100 | Level b | Good | 88 |
| Example 17 | 0/100 | Level A | 0/100 | Level a | Excellent | 91 |
| Example 18 | 0/100 | Level A | 2/100 | Level b | Good | 80 |
| Example 19 | 0/100 | Level A | 1/100 | Level b | Good | 93 |
| Example 20 | 0/100 | Level A | 0/100 | Level a | Excellent | 85 |
| Example 21 | 0/100 | Level A | 0/100 | Level a | Excellent | 91 |
| Example 22 | 0/100 | Level A | 5/100 | Level c | Fair | 75 |
| Example 23 | 0/100 | Level A | 2/100 | Level b | Good | 79 |
| Example 24 | 0/100 | Level A | 4/100 | Level c | Fair | 80 |
| Example 25 | 0/100 | Level A | 2/100 | Level b | Good | 82 |
| Example 26 | 0/100 | Level A | 1/100 | Level b | Good | 83 |
| Example 27 | 0/100 | Level A | 1/100 | Level b | Good | 82 |
| Example 28 | 0/100 | Level A | 0/100 | Level a | Excellent | 86 |
| Example 29 | 0/100 | Level A | 0/100 | Level a | Excellent | 90 |

TABLE 2

| | Adhesion | | | | | Water repellency |
|---|---|---|---|---|---|---|
| | Normal temperature and normal humidity | | High temperature and high humidity | | Comprehensive | Water contact |
| | Result | Evaluation | Result | Evaluation | evaluation | angle (°) |
| Comparative Example 1 | 100/100 | Level C | 100/100 | Level e | Very poor | 65 |
| Comparative Example 2 | 0/100 | Level A | 75/100 | Level d | Poor | 75 |
| Comparative Example 3 | 0/100 | Level A | 90/100 | Level d | Poor | 90 |
| Comparative Example 4 | 100/100 | Level C | 100/100 | Level e | Very poor | 95 |
| Comparative Example 5 | 65/100 | Level B | 95/100 | Level d | Poor | 85 |
| Comparative Example 6 | 100/100 | Level C | 100/100 | Level e | Very poor | 82 |
| Comparative Example 7 | 100/100 | Level C | 100/100 | Level e | Very poor | 84 |
| Comparative Example 8 | 100/100 | Level C | 100/100 | Level e | Very poor | 65 |
| Comparative Example 9 | 100/100 | Level C | 100/100 | Level e | Very poor | 60 |
| Comparative Example 10 | 0/100 | Level A | 65/100 | Level d | Poor | 15 |
| Comparative Example 11 | 50/100 | Level B | 100/100 | Level e | Poor | 87 |
| Comparative Example 12 | 0/100 | Level A | 55/100 | Level d | Poor | 23 |
| Comparative Example 13 | 0/100 | Level A | 48/100 | Level d | Poor | 29 |
| Comparative Example 14 | 0/100 | Level A | 55/100 | Level d | Poor | 33 |
| Comparative Example 15 | 0/100 | Level A | 78/100 | Level d | Poor | 77 |
| Comparative Example 16 | 0/100 | Level A | 92/100 | Level d | Poor | 92 |
| Comparative Example 17 | 0/100 | Level A | 70/100 | Level d | Poor | 38 |
| Comparative Example 18 | 62/100 | Level B | 100/100 | Level e | Poor | 93 |
| Comparative Example 19 | 60/100 | Level B | 95/100 | Level d | Poor | 85 |
| Comparative Example 20 | 0/100 | Level A | 70/100 | Level d | Poor | 76 |

As shown in Table 1, in all of Examples 1 to 29, the adhesion at normal temperature and normal humidity and the adhesion at high temperature and high humidity were high. In particular, Examples 1 to 3, 5, 7, 9 to 11, 16 to 21, 23, and 25 to 29 had higher adhesion at high temperature and high humidity, and Examples 1 to 3, 17, 20, 21, 28, and 29 had particularly high adhesion at high temperature and high humidity. As is clear from the adhesion evaluation procedures described above, the adhesion at high temperature and high humidity in Examples 1 to 29 was high even after the surface of the polymer layer remote from the substrate was wiped with the wipe.

Comparison of Example 1, Example 4, Example 5, and Example 12, in which the type of the monofunctional monomer having a tertiary amide group was the same (N-acryloylmorpholine), found that the adhesion at high temperature and high humidity was enhanced as the monofunctional monomer content increased in the order of Example 12 (25 parts by weight), Example 4 (26 parts by weight), Example 5 (30 parts by weight), and Example 1 (35 parts by weight). This is because the amount of the tertiary amide groups contained in the polymer layer increased in the order of Example 12, Example 4, Example 5, and Example 1. Comparison of Example 1, Example 6, Example 7, Example 1.3, Example 16, and Example 17, in which the type of the monofunctional monomer having a tertiary amide group was the same (N-acryloylmorpholine), found that the adhesion at high temperature and high humidity was about the same or enhanced as the monofunctional monomer content decreased in the order of Example 13 (60 parts by weight), Example 06 (59 parts by weight), Example 16 (55 parts by weight), Example 7 (53 parts by weight), Example 17 (50 parts by weight), and Example 1 (35 parts by weight). This is because the polarity of the polymer layer was about the same or decreased in the order of Example 13, Example 6, Example 16, Example 7, Example 17, and Example 1. The results described above show that optimizing the content of the monofunctional monomer having a tertiary amide group can suppress degradation of the adhesion between the substrate and the polymer layer even in an environment, such as a high temperature and high humidity environment, in which moisture absorption easily occurs. It was also found that, from the viewpoint of sufficiently enhancing the adhesion at high temperature and high humidity, the monofunctional monomer content is preferably 30 parts by weight or more and 55 parts by weight or less, and more preferably 35 parts by weight or more and 50 parts by weight or less.

Comparison of Example 1, Example 8, Example 18, and Example 20, in which the type of the fluorine-containing compound having a reactive group was the same, found that the adhesion at high temperature and high humidity was about the same or enhanced as the fluorine-containing compound content increased in the order of Example 8 (0.1 parts by weight), Example 18 (0.3 parts by weight), Example 20 (0.5 parts by weight), and Example 1 (1 part by weight) This is because the amount of fluorine atoms in the polymer layer increases in the order of Example 8, Example 18, Example 20, and Example 1, and the hygroscopic property is about the same, or decreased in this order. In contrast, comparison of Example 1, Example 9, Example 19, and Example 21, in which the type of the fluorine-containing compound, having a reactive group was the same, found that the adhesion at high temperature and high humidity was about the same or enhanced as the fluorine-containing compound content increased in the order of Example 9 (10 parts by weight), Example 19 (8 parts by weight), Example 21 (5 parts by weight), and Example 1 (1 part by weight). This is because the amount of fluorine atoms in the polymer layer decreased in the order of Example 9, Example 19, Example 21, and Example 1, and, as a result, the fluorine atoms efficiently aligned on the surface of the polymer layer remote from the substrate, not on the surface of the polymer layer on the substrate side. In other words, the amount, of tertiary amide groups on the surface of the polymer layer on the substrate side is greater in Example 1 than in Example 9. The results described above show that optimizing the content of the fluorine-containing compound having a reactive group can suppress degradation of the adhesion between the substrate and the polymer layer even in an environment, such as a high temperature and high humidity environment, in which moisture absorption easily occurs. It was also found that, from the viewpoint of sufficiently enhancing the adhesion at high temperature and high humidity, the content of the fluorine-containing compound having a reactive group is preferably 0.3 parts by weight or more and 8 parts by weight or less, and more preferably 0.5 parts by weight or more, and 5 parts by weight or less.

The results described above show that optimizing the content of the monofunctional monomer having a tertiary amide group and the content of the fluorine-containing compound having a reactive group can sufficiently suppress degradation of the adhesion between the substrate and the polymer layer even in an environment, such as a high temperature and high humidity environment, in which moisture absorption easily occurs.

Comparison of Example 1, Example 22, Example 23, Example 26, and Example 28, in which the content of the fluorine-containing compound having a reactive group is the same (1 part by weight), found that the adhesion at high temperature and high humidity was about the same or enhanced as the fluorine atom concentration in the fluorine-containing compound increased in the order of Example 22 (18 wt %), Example 23 (20 wt %), Example 26 (25 wt %), Example 28 (30 wt %), and Example 1 (37 wt %). This is because the amount of fluorine atoms in the polymer layer increases in the order of Example 22, Example 23, Example 26, Example 28, and Example 1, and the hygroscopic property is about the same or decreased in this order. In contrast, comparison of Example 1, Example 24, Example 25, Example 27, and Example 29, in which the content of the fluorine-containing compound having a reactive group is the same (1 part by weight), found that the adhesion at high temperature and high humidity was about the same or enhanced as the fluorine atom concentration in the fluorine-containing compound decreased in the order of Example 24 (52 wt %), Example 25 (50 wt %), Example 27 (45 wt %), Example 29 (40 wt %), and Example 1 (37 wt %). This is because the amount of fluorine atoms in the polymer layer decreased in the order of Example 24, Example 25, Example 27, Example 29, and Example 1, and, as a result, the fluorine atoms efficiently aligned on the surface of the polymer layer remote from the substrate, not on the surface of the polymer layer on the substrate side. The results described above show that optimizing the fluorine atom concentration in the fluorine-containing compound having a reactive group can suppress degradation of the adhesion between the substrate and the polymer layer even in an environment, such as a high temperature and high humidity environment, in which moisture absorption easily occurs. It was also found that, from the viewpoint of sufficiently enhancing the adhesion at high temperature and high humidity, the fluorine atom concentration in the fluorine-containing compound having a reactive group is preferably 20 wt % or more and 50 wt % or less, more preferably 25 wt % or more and 45 wt % or less, and yet more preferably 30 wt % or more and 40 wt % or less.

Examples 1 to 29 had excellent water repellency and an excellent antifouling property for hydrophilic stains. This is because the polymerizable composition constituting the polymer layer contains the fluorine-containing compound having a reactive group, and the surface energy of the polymer layer is low.

In contrast, as shown in Table 2, Comparative Examples 1 to 20 all had low adhesion at high temperature and high humidity. In Comparative Examples 1 and 4 to 9, in which the content of the monofunctional monomer having a tertiary amide group was as small as 1 part by weight, the adhesion at normal temperature and normal humidity and the adhesion at high temperature and high humidity were both low. In Comparative Example 2 and Comparative Example 15, in which the content of the monofunctional monomer having a tertiary amide group was less than 25 parts by weight, the adhesion at high temperature and high humidity was low due to an excessively small amount of tertiary amide groups in the polymer layer. In Comparative Example 3 and Comparative Example 16, in which the content of the monofunctional monomer having a tertiary amide group was greater than 60 parts by weight, the adhesion at high temperature and high humidity was low due to excessively high polarity of the polymer layer. In Comparative Example 10, Comparative Example 12, Comparative Example 13, and Comparative Example 14, in which the fluorine-containing compound having a reactive group was not contained, the hygroscopic property was high, and the adhesion at high temperature and high humidity was low. In Comparative Example 10, Comparative Example 12, Comparative Example 13, and Comparative Example 14, in which the fluorine-containing compound having a reactive group was not contained, the water contact angle was smaller and water repellency was inferior compared to Examples 1 to 29. In Comparative Example 11 and Comparative Example 18, the content of the fluorine-containing compound having a reactive group was greater than 10 parts by weight, and the amount of fluorine atoms in the polymer layer was excessively large. As a result, the amount of tertiary amide groups on the surface of the polymer layer on the substrate side becomes relatively small, and the adhesion at normal temperature and normal humidity and the adhesion at high temperature and high humidity were both low. In Comparative Example 17 in which the content of the fluorine-containing compound having a reactive group was less than 0.1 parts by weight, the amount of fluorine atoms in the polymer layer was excessively small, and thus the hygroscopic property was high and the adhesion at high temperature and high humidity was low. In comparative Example 17, water contact angle was smaller and water repellency was inferior compared to Examples 1 to 29. *In Comparative Example* 19, the polyfunctional acrylate content was less than 30 parts by weight, and the fluorine-containing compound content was relatively large. As a result, the amount of tertiary amide groups on the surface of the polymer layer on the substrate side became relatively small, and the adhesion at normal temperature and normal humidity and the adhesion at high temperature and high humidity were both low. In Comparative Example 20, the polyfunctional acrylate content was greater than 75 parts by weight, and the monofunctional monomer content was relatively small. As a result, the amount of the tertiary amide groups in the polymer layer was excessively small, and thus the adhesion at high temperature and high humidity was low.

[Appendix]

Examples of preferable embodiments of the optical member of the present invention are as follows. The following examples may be combined as appropriate without departing from the scope of the gist of the present invention.

The monofunctional monomer may contain at least one monomer selected from the group consisting of N-acryloylmorpholine, N,N-dimethylacrylamide, and N,N-diethylacrylamide. According to this feature, the monofunctional monomer can be effectively used.

The fluorine atom concentration in the fluorine-containing compound may be 20 wt % or more and 50 wt % or less. According to this feature, the fluorine atoms can smoothly align on the surface of the polymer layer remote from the substrate. As a result, degradation of the adhesion between the substrate and the polymer layer caused by moisture absorption can be further suppressed.

The fluorine atom concentration in the fluorine-containing compound may be 25 wt % or more and 45 wt % or less. According to this feature, degradation of the adhesion between the substrate and the polymer layer caused by moisture absorption can be further suppressed.

The fluorine atom concentration in the fluorine-containing compound may be 30 wt % or more and 40 wt % or less. According to this feature, degradation of the adhesion between the substrate and the polymer layer caused by moisture, absorption can be further suppressed.

The monofunctional monomer content may be 30 parts by weight or more and 55 parts by weight or less. According to this feature, degradation of the adhesion between the substrate and the polymer layer caused by moisture absorption can be further suppressed.

The monofunctional monomer content may be 35 parts by weight or more and 50 parts by weight or less. According to this feature, degradation of the adhesion between the substrate and the polymer layer caused by moisture absorption can be further suppressed.

The fluorine-containing compound content may be 0.3 parts by weight or more and 8 parts by weight or less. According to this feature, degradation of the adhesion between the substrate and the polymer layer caused by moisture absorption can be further suppressed.

The fluorine-containing compound content may be 0.5 parts by weight or more and 5 parts by weight or less. According to this feature, degradation of the adhesion between the substrate and the polymer layer caused by moisture absorption can be further suppressed.

Although preferable embodiments of the optical member of the present invention are described above, embodiments related to the features of the polymerizable composition among these examples are also examples of the preferable embodiments of the polymerizable composition for nanoimprint.

REFERENCE SIGNS LIST

1: optical member
2: substrate
3: polymer layer
4: protrusion
5: polymerizable composition
6: mold
P: pitch

The invention claimed is:

1. An optical member comprising:
a substrate; and
a polymer layer in direct contact with the substrate and having an indented structure on a surface thereof, the indented structure including a plurality of protrusions formed at a pitch not greater than a wavelength of visible light,
wherein triacetylcellulose is present on at least a surface of the substrate on a polymer layer side,
the polymer layer is formed from a polymerizable composition polymerizable by active energy ray irradiation,
the polymerizable composition contains 30 parts by weight or more and less than 75 parts by weight of a polyfunctional acrylate, 30 parts by weight or more and 55 parks by weight or less of a monofunctional monomer having a tertiary amide group, and 0.3 parts by weight or more and 10 parts by weight or less of a fluorine-containing compound having a reactive group, and
a concentration of fluorine atoms in the fluorine-containing compound is 20 wt % or more and 50 wt % or less.

2. The optical member according to claim 1, wherein the monofunctional monomer contains at least one monomer selected from the group consisting of N-acryloylmorpholine, N,N-dimethylacrylamide, and N,N-diethylacrylamide.

3. The optical member according to claim 1, wherein the concentration of fluorine atoms in the fluorine-containing compound is 25 wt % or more and 45 wt % or less.

4. The optical member according to claim 3, wherein the concentration of fluorine atoms in the fluorine-containing compound is 30 wt % or more and 40 wt % or less.

5. The optical member according to claim 1, wherein the content of the monofunetional monomer is 35 parts by weight or more and 50 parts by weight or less.

6. The optical member according to claim 1, Wherein a content of the fluorine-containing compound is 0.3 parts by weight or more and 8 parts by weight or less.

7. The optical member according to claim 6, wherein the content of the fluorine-containing compound is 0.5 parts by weight or more and 5 parts by weight or less.

8. The optical member according to claim 2, wherein the concentration of fluorine atoms in the fluorine-containing compound is 25 wt % or more and 45 wt % or less.

9. The optical member according to claim 8, wherein the concentration of fluorine atoms in the fluorine-containing compound is 30 wt % or more and 40 wt % or less.

10. The optical member according to claim 2, wherein the content of the monofunctional monomer is 35 parts by weight or more and 50 parts by weight or less.

11. The optical member according to claim 2, wherein a content of the fluorine-containing compound is 0.3 parts by weight or more and 8 parts by weight or less.

* * * * *